US010871596B2

United States Patent
Masuda et al.

(10) Patent No.: US 10,871,596 B2
(45) Date of Patent: Dec. 22, 2020

(54) ANTIREFLECTION FILM, ANTIREFLECTION PRODUCT, POLARIZING PLATE, IMAGE DISPLAY DEVICE, MODULE, LIQUID CRYSTAL DISPLAY DEVICE WITH TOUCH PANEL, AND METHOD OF MANUFACTURING ANTIREFLECTION FILM

(71) Applicant: FUJIFILM Corporation, Tokyo (JP)

(72) Inventors: Chihiro Masuda, Kanagawa (JP); Miho Asahi, Kanagawa (JP); Yuta Fukushima, Kanagawa (JP); Ryuji Saneto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/276,164

(22) Filed: Feb. 14, 2019

(65) Prior Publication Data
US 2019/0187336 A1    Jun. 20, 2019

Related U.S. Application Data

(63) Continuation of application No. PCT/JP2017/027315, filed on Jul. 27, 2017.

(30) Foreign Application Priority Data

Aug. 15, 2016 (JP) ................................. 2016-159295
Feb. 16, 2017 (JP) ................................. 2017-027380
Mar. 31, 2017 (JP) ................................. 2017-072565

(51) Int. Cl.
G02B 1/118        (2015.01)
G02B 1/111        (2015.01)
(Continued)

(52) U.S. Cl.
CPC .............. *G02B 1/118* (2013.01); *G02B 1/111* (2013.01); *G02B 1/14* (2015.01);
(Continued)

(58) Field of Classification Search
CPC .......................... G02B 1/118; G02F 1/133502
See application file for complete search history.

(56) References Cited

U.S. PATENT DOCUMENTS

2008/0218866 A1    9/2008  Kawata et al.
2009/0075074 A1*   3/2009  Horio ....................... C09D 4/00
                                                         428/341

(Continued)

FOREIGN PATENT DOCUMENTS

JP    S64-080904 A     3/1989
JP    2008-216733 A    9/2008
(Continued)

OTHER PUBLICATIONS

Office Action, issued by the Japanese Patent Office dated Sep. 24, 2019, in connection with Japanese Patent Application No. 2017-072565.
(Continued)

Primary Examiner — Jessica M Merlin
(74) Attorney, Agent, or Firm — Edwards Neils LLC; Jean C. Edwards, Esq.

(57) ABSTRACT

An antireflection film including: a plastic substrate; and an antireflection layer, where the antireflection layer includes a metal oxide particle and a binder resin, the antireflection layer has a moth eye structure including an uneven shape formed by the metal oxide particle, a total light transmittance of the antireflection film where light is incident from a side of the antireflection layer opposite the plastic substrate is 88% or more, and where transmittances of light at wavelengths of 480 nm and 580 nm of the antireflection film
(Continued)

where the light is incident from a side of the antireflection layer opposite the plastic substrate are respectively $T_{480}$ and $T_{580}$, $T_{580}-T_{480} \leq 3.5\%$ is satisfied, and a method of manufacturing the antireflection film, and an antireflection product, a polarizing plate, an image display device, a module, and a liquid crystal display device with a touch panel, containing the antireflection film.

3 Claims, 2 Drawing Sheets

(51) Int. Cl.
| | | |
|---|---|---|
| *G02B 1/14* | (2015.01) | |
| *G02F 1/1335* | (2006.01) | |
| *G02F 1/1333* | (2006.01) | |
| *G02B 5/30* | (2006.01) | |

(52) U.S. Cl.
CPC .. *G02F 1/133502* (2013.01); *G02F 1/133528* (2013.01); *G02B 5/30* (2013.01); *G02F 1/13338* (2013.01)

(56) References Cited

U.S. PATENT DOCUMENTS

| | | | |
|---|---|---|---|
| 2011/0217541 A1* | 9/2011 | Shimano | C09D 5/006 428/323 |
| 2015/0253466 A1 | 9/2015 | Ibuki et al. | |
| 2016/0061997 A1* | 3/2016 | Kamohara | G02B 1/118 428/323 |
| 2016/0077239 A1 | 3/2016 | Asahi et al. | |
| 2016/0216410 A1 | 7/2016 | Asahi et al. | |
| 2017/0015087 A1 | 1/2017 | Asahi et al. | |
| 2018/0141245 A1 | 5/2018 | Wakizaka et al. | |

FOREIGN PATENT DOCUMENTS

| | | | |
|---|---|---|---|
| JP | 2009-139796 A | | 6/2009 |
| JP | 2012-145748 A | | 8/2012 |
| JP | 2012145748 | * | 8/2012 |
| JP | 2014-095731 A | | 5/2014 |
| JP | 2015-074087 A | | 4/2015 |
| JP | 2015-169848 A | | 9/2015 |
| JP | 2016-061794 A | | 4/2016 |
| JP | 2016-71133 A | | 5/2016 |
| JP | 2016-136228 A | | 7/2016 |
| KR | 10-2016-0031448 A | | 3/2016 |
| WO | 2017/006936 A1 | | 1/2017 |

OTHER PUBLICATIONS

International Search Report issued in PCT/JP2017/027315 dated Sep. 12, 2017.
Written Opinion issued in PCT/JP2017/027315 dated Sep. 12, 2017.
International Preliminary Report on Patentability completed by WIPO on Feb. 19, 2019, in connection with International Patent Application No. PCT/JP2017/027315.
Office Action, Issued by the State Intellectual Property Office dated Mar. 3, 2020, in connection with corresponding Chinese Patent Application No. 201780050120.4.
Office Action, Issued by the Korean Intellectual Property Office dated Mar. 30, 2020, in connection with corresponding Korean Patent Application No. 10-2019-7004406.
Office Action, issued by the Japanese Patent Office dated Jun. 2, 2020, in connection with corresponding Japanese Patent Application No. 2017-072565.
Office Action, issued by the State Intellectual Property Office dated Sep. 8, 2020, in connection with Chinese Patent Application No. 201780050120.4.
Office Action, issued by the Korean Intellectual Property Office dated Oct. 7, 2020, in connection with Korean Patent Application No. 10-2019-7004406.

* cited by examiner

ANTIREFLECTION FILM, ANTIREFLECTION PRODUCT, POLARIZING PLATE, IMAGE DISPLAY DEVICE, MODULE, LIQUID CRYSTAL DISPLAY DEVICE WITH TOUCH PANEL, AND METHOD OF MANUFACTURING ANTIREFLECTION FILM

CROSS-REFERENCE TO RELATED APPLICATIONS

This is a continuation of International Application No. PCT/JP2017/027315 filed on Jul. 27, 2017, which was published under Article 21(2) in Japanese and which claims priority under 35 U.S.C. § 119(a) from Japanese Patent Application No. JP2016-159295 filed on Aug. 15, 2016, Japanese patent application No. JP2017-027380 filed on Feb. 16, 2017, and Japanese patent application No. JP2017-072565 filed on Mar. 31, 2017. The above applications are hereby expressly incorporated by reference, in their entirety, into the present application.

BACKGROUND OF THE INVENTION

1. Field of the Invention

The present invention relates to an antireflection film, an antireflection product, a polarizing plate, an image display device, a module, a liquid crystal display device with a touch panel, and a method of manufacturing an antireflection film.

2. Description of the Related Art

In an image display device such as a display device using a cathode ray tube (CRT), a plasma display panel (PDP), an electroluminescent display (ELD), a vacuum fluorescent display (VFD), a field emission display (FED), and a liquid crystal display (LCD), an antireflection film may be provided in order to prevent decrease in contrast due to reflection of external light on a display surface and reflected glare of an image. A liquid crystal display device with a touch panel has a structure in which a touch panel and a liquid crystal panel including a liquid crystal cell are disposed with an air gap therebetween in some cases, but in order to prevent decrease of contrast by reflected light on an interface between the touch panel and the air gap or an interface between the air gap and the liquid crystal panel or generation of Newton ring, a method of disposing antireflection films on the interface between the touch panel and the air gap and the interface between the air gap and the liquid crystal panel has been known. In addition to the image display device, the antireflection function may be provided to a glass surface of the showroom or the like by an antireflection film.

As the antireflection film, an antireflection film having a fine uneven shape with a period equal to or less than the wavelength of visible light on the surface of a substrate, that is, an antireflection film having a so-called moth eye structure is known. The moth eye structure makes a refractive index gradient layer in which the refractive index successively changes in a pseudo manner from the air toward the bulk material inside the substrate, and reflection of the light can be prevented.

As an antireflection film having a moth eye structure, JP2009-139796A discloses the antireflection film having a moth eye structure that is manufactured by a method of coating a transparent substrate with a coating liquid containing a transparent resin monomer and a fine particle, curing the coating liquid, forming a transparent resin in which a fine particle is dispersed, and then etching the transparent resin.

SUMMARY OF THE INVENTION

However, it has been known that the antireflection film of JP2009-139796A has low transmittance of light in a short wavelength range of visible light. Specifically, this is because the transmittance of light at a wavelength of 480 nm compared with the transmittance of light at a wavelength of 580 nm is small. As the reason thereof, it is considered that, due to an unevenness period of a moth eye structure, light interferes, and specifically, diffracted light of a double wavelength of the unevenness period interferes. In a case where the transmittance of light in a short wavelength range of visible light is low, a tint easily changes, and particularly, in a case where two or more antireflection films are used, this problem becomes remarkable. Examples of a case where two or more antireflection films are used include a liquid crystal display device with a touch panel.

The object of the present invention is to provide an antireflection film having satisfactory antireflection performance, high total light transmittance, and high transmittance of light in a short wavelength range of visible light, and a method of manufacturing the antireflection film, and an antireflection product, a polarizing plate, an image display device, a module, and a liquid crystal display device with a touch panel each of which has the antireflection film.

<1>
An antireflection film comprising:
a plastic substrate; and
an antireflection layer,
in which the antireflection layer includes a metal oxide particle and a binder resin,
the antireflection layer has a moth eye structure including an uneven shape formed by the metal oxide particle,
a total light transmittance of the antireflection film in a case where light is incident from a side of the antireflection layer opposite to the plastic substrate is 88% or more, and
in a case where transmittances of light at wavelengths of 480 nm and 580 nm of the antireflection film in a case where the light is incident from a side of the antireflection layer opposite to the plastic substrate are respectively $T_{480}$ and $T_{580}$, $T_{580}-T_{480} \leq 3.5\%$ is satisfied.

<2>
The antireflection film according to <1>,
in which in a case where an average value of distances A between peaks of adjacent protrusions in the uneven shape is X, the uneven shape of the antireflection layer satisfies $X \leq 190$ nm.

<3>
The antireflection film according to <2>,
in which in a case where a standard deviation representing distribution of A is σ, the uneven shape of the antireflection layer satisfies $X+\sigma \leq 190$ nm.

<4>
The antireflection film according to any one of <1> to <3>,
in which an average primary particle diameter of the metal oxide particle is 100 nm to 190 nm.

<5>
The antireflection film according to any one of <1> to <4>,
in which the binder resin includes a compound having two or less polymerizable functional groups in one molecule or a compound not having a polymerizable functional group in which a viscosity at 25° C. is 1 to 20 mPas.

<6>

The antireflection film according to any one of <1> to <5>, further comprising:

a hard coat layer between the plastic substrate and the antireflection layer.

<7>

The antireflection film according to <6>, in which the hard coat layer includes a quaternary ammonium salt-containing polymer, and in a case where a surface resistivity of the antireflection layer is SR in a unit of Ω/sq, a common logarithm value of SR is 11 or less, and in a case where an average value of the distances A between peaks of adjacent protrusions in the uneven shape is X, and a standard deviation representing distribution of A is σ, the uneven shape of the antireflection layer satisfies X+σ≤190 nm.

<8>

An antireflection product comprising:

the antireflection film according to any one of <1> to <7> on a surface thereof.

<9>

A polarizing plate comprising:

a polarizer; and at least one protective film for protecting the polarizer, in which at least one protective film is the antireflection film according to any one of <1> to <7>.

<10>

An image display device comprising:

the antireflection film according to any one of <1> to <7> or the polarizing plate according to <9>.

<11>

A module comprising: two antireflection films according to any one of <1> to <7>, in which the two antireflection films are placed to face each other via an air gap.

<12>

The module according to <11>, in which in the two antireflection films, the antireflection layer is disposed closer to the air gap side than the plastic substrate.

<13>

A liquid crystal display device with a touch panel comprising:

the module according to <12>;

a touch panel on a side of the plastic substrate of one antireflection film of the two antireflection films opposite to the antireflection layer side; and a liquid crystal cell on a side of the plastic substrate of the other antireflection film opposite to the antireflection layer side.

<14>

A method of manufacturing antireflection film comprising, in this order:

a step (1) of providing a curable compound and a metal oxide particle having an average primary particle diameter of 100 nm to 190 nm on a plastic substrate, in a thickness in which the metal oxide particle is buried in a layer (a) including the curable compound;

a step (2) of bonding a layer (b) of a pressure sensitive film having a support and the layer (b) including a pressure sensitive adhesive having a gel fraction of 95.0% or more on the support to the layer (a);

a step (3) of moving a position of an interface between the layer (a) and the layer (b) to the plastic substrate side such that the metal oxide particle is buried in a layer obtained by combining the layer (a) and the layer (b) and protrudes from an interface of the layer (a) on a side opposite to an interface on the plastic substrate side;

a step (4) of curing the layer (a) in a state in which the metal oxide particle is buried in the layer obtained by combining the layer (a) and the layer (b); and a step (5) of peeling off the layer (b) from the layer (a), in which a temperature in a case of performing the steps (1) to (4) is 60° C. or lower.

According to the present invention, it is possible to provide an antireflection film having satisfactory antireflection performance, high total light transmittance, and high transmittance of light in a short wavelength range of visible light, and a method of manufacturing the antireflection film, and an antireflection product, a polarizing plate, an image display device, a module, and a liquid crystal display device with a touch panel each of which has the antireflection film.

DESCRIPTION OF THE PREFERRED EMBODIMENTS

Figure 1:
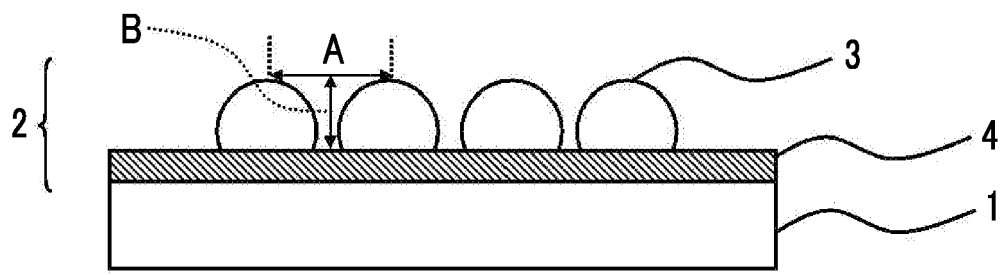
FIG. 1 is a schematic cross-sectional view illustrating an example of the antireflection film of the present invention.

In the present specification, the numerical range expressed by using "to" means a range including numerical values described before and after "to" as a lower limit value and an upper limit value.

"(Meth)acrylate" refers to at least one of acrylate or methacrylate, "(meth)acryl" refers to at least one of acryl or methacryl, and "(meth)acryloyl" refers to at least one of acryloyl or methacryloyl.

The weight-average molecular weight and the number-average molecular weight according to the present invention are a value measured in the following conditions by the gel permeation chromatography (GPC).

[Solvent] Tetrahydrofuran
[Device Name] TOSOH HLC-8220GPC
[Column] Three items of TOSOH TSKgel Super HZM-H (4.6 mm×15 cm) are linked to be used.
[Column temperature] 25° C.
[Sample concentration] 0.1 mass %
[Flow rate] 0.35 ml/min
[Calibration Curve] A calibration curve with seven samples of TSK standard polystyrene manufactured by TOSOH Corporation Mw=2,800,000 to 1,050 is used.

[Antireflection Film]

The antireflection film according to the embodiment of the present invention is an antireflection film including a plastic substrate and an antireflection layer, the antireflection layer includes a metal oxide particle and a binder resin, the antireflection layer has a moth eye structure including an uneven shape formed by the metal oxide particle, a total light transmittance of the antireflection film in a case being incident from a side of the antireflection layer opposite to the plastic substrate is 88% or more, and in a case where transmittances of light at wavelengths of 480 nm and 580 nm of the antireflection film in a case of being incident from a side of the antireflection layer opposite to the plastic substrate are respectively $T_{480}$ and $T_{580}$, $T_{580}-T_{480} \leq 3.5\%$ is satisfied.

The antireflection film according to the embodiment of the present invention has a plastic substrate and an antireflection layer, and the plastic substrate and the antireflection layer are laminated. The plastic substrate and the antireflection layer may be directly laminated or may be laminated via another layer (preferably a hard coat layer).

The total light transmittance of the antireflection film in a case of being incident from a side of the antireflection layer of the antireflection film according to the embodiment of the present invention opposite to the plastic substrate is 88% or more, preferably 90% or more, more preferably 92% or more, and even more preferably 94% or more.

In a case where the total light transmittance of the antireflection film in a case of being incident from a side of the antireflection layer of the antireflection film opposite to the plastic substrate is 88% or more, the transparency of the antireflection film increases, and particularly, in a case where two or more antireflection films are used, visibility hardly decreases.

The total light transmittance is measured in conformity with Japanese Industrial Standards (JIS) K7361-1 (1997).

Means for causing the total light transmittance of the antireflection film in a case of being incident from a side the antireflection layer of the antireflection film opposite to the plastic substrate to be 88% or more is not particularly limited, but examples thereof include an antireflection film with a plastic substrate having high total light transmittance. As described below, it is preferable to cause an average value X of a distance A between peaks of adjacent protrusions of the uneven shape of the antireflection layer to be 190 nm or less, in view of preventing the decrease of the transmittance of the visible light range.

In a case where the transmittances of the light at wavelengths of 480 nm and 580 nm of the antireflection film in a case of being incident from a side of the antireflection layer of the antireflection film according to the embodiment of the present invention opposite to the plastic substrate are respectively $T_{480}$ and $T_{580}$, $T_{480}$ and $T_{580}$ satisfy $T_{580}-T_{480} \leq 3.5\%$, preferably satisfies $0\% \leq T_{580}-T_{480} \leq 3.0\%$, more preferably satisfies $0\% \leq T_{580}-T_{480} \leq 2.5\%$, and even more preferably satisfies $0\% \leq T_{580}-T_{480} \leq 2.0\%$.

In a case where $T_{580}-T_{480} \leq 3.5\%$ is satisfied, that is, $T_{580}-T_{480}$ is 3.5% or less, for example, it is possible to suppress the tint change of a display image in a case where the antireflection film is applied to the image display device. Particularly, in a case where two or more antireflection films are used, the tint change hardly occurs.

$T_{480}$ and $T_{580}$ are measured in conformity with Japanese Industrial Standards (JIS) K0115 (2004).

Means for causing $T_{580}-T_{480}$ to be 3.5% or less is not particularly limited, it is preferable that the average value X of the distance A between peaks of adjacent protrusions of the uneven shape of the antireflection layer to be 190 nm or less, and it is more preferable that in a case where a standard deviation representing the distribution of A is σ, X+σ is 190 nm or less. In a case where the uneven shape is adjusted in this manner, even in a case where the diffracted light at a double wavelength of the unevenness period interferes, the light does not in the range of the visible light at a wavelength of 380 nm or more, and thus it is possible to prevent the decrease of the transmittance in a short wavelength range of the visible light, such that the total light transmittance can be 88% or more, and $T_{580}-T_{480}$ can be 3.5% or less.

The antireflection film according to the embodiment of the present invention throughout the total range of the wavelength of 380 to 780 nm is preferably 3% or less and more preferably 2% or less.

An example of a preferable embodiment of an antireflection film according to the embodiment of the present invention is illustrated in FIG. 1.

An antireflection film 10 in FIG. 1 has a plastic substrate 1 and an antireflection layer 2. The antireflection layer 2 includes a metal oxide particle 3 and a binder resin 4. The metal oxide particle 3 protrudes from the binder resin 4 and forms an uneven shape, and the uneven shape has a moth eye structure.

(Moth Eye Structure)

The antireflection layer of the antireflection film according to the embodiment of the present invention has a moth eye structure including an uneven shape formed by the metal oxide particle.

It is preferable that the uneven shape is formed on the surface on a side of the antireflection layer opposite to the interface on the plastic substrate side.

In the uneven shape formed by the metal oxide particle, it is preferable that the respective metal oxide particles protruding from a film of the binder resin become protrusions, and portions in which the metal oxide particle are not present become a recessed part.

The moth eye structure formed of an uneven shape indicates that the uneven shape has a moth eye structure.

As long as the moth eye structure can be formed, other components such as a binder resin may be present on the surface of the metal oxide particle that forms the protrusion.

The moth eye structure refers to a surface obtained by processing of a substance (material) for suppressing reflection of light and a structure of having a periodic microstructure pattern. Particularly, in a case of having the purpose of suppressing reflection of visible light, the moth eye structure refers to a structure having a microstructure pattern with a period of less than 780 nm. It is preferable that the period of the microstructure pattern is less than 190 nm, the tint of reflected light becomes small. It is preferable that the period of the uneven shape of the moth eye structure is 100 nm or more, light having a wavelength of 380 nm can recognize a microstructure pattern and is excellent in antireflection properties. Whether the moth eye structure is present can be checked by observing the surface shape with a scanning electron microscope (SEM), an atomic force microscope (AFM), or the like, and checking whether the microstructure pattern can be formed.

In the uneven shape of the antireflection layer of the antireflection film according to the embodiment of the present invention, it is preferable that B/A which is the ratio of a distance A between the peaks of the adjacent protrusions and a distance B between the center between the peaks of the adjacent protrusions and the recessed part is 0.4 or more. In a case where B/A is 0.4 or more, the refractive index gradient layer in which the depth of the recessed part is greater than the distance between the protrusions and the refractive index gradually changes from the air to the inside of the antireflection layer can be formed, and thus the reflectance can be further reduced.

B/A is more preferably 0.5 or more. In a case where B/A is 0.5 or more, the distance A between the peaks of the adjacent protrusions (protrusions formed by the particles) becomes the particle diameter or more, such that the recessed part is formed between particles. As a result, it is assumed that, in a case where both of the interface reflection due to a region having a sharp change on the refractive index depending on the curvature of the upper side of the protrusion and the interface reflection due to a region having a sharp change on the refractive index depending on the curvature of the recessed part between the particles are present, in addition to the refractive index gradient layer effect by the moth eye structure, the reflectance is more effectively reduced.

B/A can be controlled by the volume ratio of the binder resin and the metal oxide particle in the antireflection layer. Therefore, it is important to appropriately design the formulation ratio of the binder resin and the metal oxide particle.

In a case where the average value of the distances A between peaks of the adjacent protrusions is X, the uneven shape of the antireflection layer of the antireflection film according to the embodiment of the present invention preferably satisfies $X \leq 190$ nm, more preferably satisfies $X \leq 180$ nm, and even more preferably satisfies $X \leq 170$ nm.

In a case where $X \leq 190$ nm is satisfied, that is, X is 190 nm or less, as described above, it is possible to prevent the decrease of the transmittance of the short wavelength range of the visible light.

In a case where the standard deviation representing the distribution of A as described above is $\sigma$, in view of satisfying $X + \sigma \leq 190$ nm, it is more preferable to satisfy $X \leq 180$ nm and it is even more preferable to satisfy $X \leq 170$ nm.

Means for forming an uneven shape in which $X \leq 190$ nm is satisfied is not particularly limited, but examples thereof include suppressing forming of a cavity between metal oxide particles by (i) using metal oxide particles having an average primary particle diameter of 190 nm or less or (ii) preventing aggregation of metal oxide particles. Examples of the method of (ii) preventing aggregation of the metal oxide particle include (ii-1) a method of suppress viscosity decrease of a binder resin or movement of metal oxide particles accompanying the convection by causing the temperature in a case of manufacturing antireflection film to be 60° C. or lower or (ii-2) a method of forming a bond between the metal oxide particle and the substrate.

Even in a case where A has distribution, in view of preventing the decrease of the transmittance in a short wavelength range of the visible light, in a case where the standard deviation representing the distribution of A is $\sigma$, it is preferable that $X + \sigma \leq 240$ nm is satisfied, it is more preferable that $X + \sigma \leq 230$ nm is satisfied, it is even more preferable that $X + \sigma \leq 210$ nm is satisfied, it is particularly preferable that $X + \sigma \leq 200$ nm is satisfied, and it is most preferable that $X + \sigma \leq 190$ nm is satisfied.

In a case where $X + \sigma \leq 190$ nm is satisfied, that is, $X + \sigma$ is 190 nm or less, as described above, it is possible to prevent the decrease of the transmittance of the short wavelength range of the visible light.

Means for forming an uneven shape in which $X + \sigma \leq 190$ nm is satisfied is not particularly limited, but examples thereof include (i) using metal oxide particles having an average primary particle diameter of 190 nm or less or (ii) preventing the aggregation of metal oxide particles. Examples of the means for preventing the aggregation of the metal oxide particle of the (ii) include (ii-1) a method of causing the temperature in a case of manufacturing antireflection film to be 60° C. or lower or (ii-2) a method of forming a bond between the metal oxide particle and the substrate.

The method of measuring the distance A between peaks of adjacent protrusions and a distance B (depth of recessed part) between a center between peaks of adjacent protrusions and a recessed part are specifically described below.

The distance B can be measured by SEM observation of a cross section of the antireflection film. The antireflection film sample is cut with a microtome to obtain a cross section and SEM observation is performed at an appropriate magnification (about 5,000 times). For easier observation, a suitable treatment such as carbon vapor deposition and etching may be applied to the sample. The distance B is a distance between a straight line connecting peaks of adjacent protrusions in an in-plane that includes the peaks of adjacent protrusions and is perpendicular to the surface of the substrate at the interface formed by the air and the sample and a recessed part which is a point at which a perpendicular bisector thereof reaches the particle or the binder resin. An average value in a case where the distance A between the peaks of the adjacent protrusions is measured at 100 points is calculated as X.

The standard deviation indicating the unevenness of the measured distances A is calculated as $\sigma$.

In the SEM picture, with respect to the entire captured unevenness, the distance A between peaks of adjacent protrusions and the distance B between a center between peaks of adjacent protrusions and a recessed part may not be correctly measured in some cases, but in that case, measuring may be performed by paying attention to a protrusion and a recessed part captured on a front side of the SEM image.

It is required to measure the recessed part with respect to the depth which is the same as the particles that form two adjacent protrusions measured in the SEM image. This is because, in a case where a distance between particles captured on a more front side is measured as B, B may be estimated to be shorter in some cases.

In order to realize the low reflectance and suppress the occurrence of haze, it is preferable that the metal oxide particles for forming the protrusions are uniformly spread at an appropriate filling rate. In view of the above, the content of the metal oxide particle for forming the protrusions is preferably adjusted such that the metal oxide particles are uniform over the entire antireflection layer. The filling rate can be measured as the area occupation ratio (particle occupancy ratio) of the metal oxide particle located on the most surface side in a case of observing the metal oxide particle for forming the protrusions from the surface by a SEM or the like, and is preferably 25% to 64%, more preferably 25% to 50%, and even more preferably 30% to 45%.

The uniformity of the surface of the antireflection film can be evaluated by haze. With respect to the measurement, a film sample of 40 mm×80 mm can be measured according to JIS-K 7136 (2000) with a haze meter NDH 4000 manufactured by Nippon Denshoku Industries Co., Ltd. at 25° C. and a relative humidity of 60%. In a case where a particle aggregated and was not uniform, the haze was high. It is preferable that the haze was lower. The value of the haze is preferably 0.0% to 3.0%, more preferably 0.0% to 2.5%, and even more preferably 0.0% to 2.0%.

(Plastic Substrate)

A plastic substrate of an antireflection film according to the embodiment of the present invention is described.

The plastic substrate is not particularly limited, as long as the substrate is a substrate having light transmittance that is generally used as a substrate of an antireflection film. As the plastic substrate, various kinds thereof can be used. Examples thereof include a substrate containing a cellulose-based resin; cellulose acylate (triacetate cellulose, diacetyl cellulose, and acetate butyrate cellulose) and the like; a polyester resin; polyethylene terephthalate and the like, a (meth)acrylic resin, a polyurethane-based resin, polycarbonate, polystyrene, an olefin-based resin, and the like. A substrate containing cellulose acylate, polyethylene terephthalate, or a (meth)acrylic resin is preferable, a substrate containing cellulose acylate is more preferable, and a cellulose acylate film is particularly preferable. As the cellulose acylate, substrates and the like disclosed in JP2012-093723A can be preferably used.

The thickness of the plastic substrate is usually about 10 μm to 1,000 μm. However, in view of satisfactory handleability, high light transmittance, and sufficient strength, the thickness is preferably 15 μm to 200 μm, more preferably 20 μm to 200 μm, even more preferably 20 μm to 100 μm, and particularly preferably 25 μm to 100 μm.

Particularly, in a case where two or more antireflection films are used, thin plastic substrates can be preferably used. The thickness of the plastic substrate in this case is preferably 20 μm to 40 μm and more preferably 25 μm to 40 μm.

As the light transmittance of the plastic substrate, those having the total light transmittance of 90% or more are preferable.

(Antireflection Layer)

An antireflection layer of an antireflection film according to the embodiment of the present invention is described.

The antireflection layer includes a metal oxide particle and a binder resin.

(Binder Resin)

The binder resin preferably has a function of binding a metal oxide particle to a plastic substrate or a laminate of a plastic substrate and another layer.

It is preferable that the binder resin is formed as a film as illustrated in FIG. 1.

It is preferable that the binder resin includes a cured product of the curable compound.

The binder resin can be obtained by curing a curable compound.

A curable compound used in the forming of the binder resin is referred to as a curable compound (a1).

<Curable Compound (a1)>

The curable compound (a1) is preferably a compound (preferably an ionizing radiation curable compound) having a polymerizable functional group. As the compound having a polymerizable functional group, various monomer oligomers, and polymers can be used. As the polymerizable functional group (polymerizable group), photopolymerizable, electron beam polymerizable, or radiation polymerizable groups are preferable. Among the groups, a photopolymerizable functional group is preferable.

Examples of the photopolymerizable functional group include a polymerizable unsaturated group (carbon-carbon unsaturated double bond group) such as a (meth)acryloyl group, a vinyl group, a styryl group, and an allyl group. Among the groups, a (meth)acryloyl group is preferable.

Specific examples of the compound having a polymerizable unsaturated group include (meth)acrylic acid diesters of alkylene glycol such as neopentyl glycol acrylate, 1,6-hexanediol (meth)acrylate, and propylene glycol di(meth)acrylate;

(meth)acrylic acid diesters of polyoxyalkylene glycol such as triethylene glycol di(meth)acrylate, dipropylene glycol di(meth)acrylate, polyethylene glycol di(meth)acrylate, and polypropylene glycol di(meth)acrylate;

(meth)acrylic acid diesters of polyhydric alcohol such as pentaerythritol di(meth)acrylate; and (meth)acrylic acid diesters of an ethylene oxide or propylene oxide adduct such as 2,2-bis {4-(acryloxy.diethoxy) phenyl} propane, and 2-2-bis {4-(acryloxy.polypropoxy) phenyl} propane.

Epoxy (meth)acrylates, urethane (meth)acrylates, and polyester (meth)acrylates are also preferably used as a compound having a photopolymerizable functional group.

Among these, esters of polyhydric alcohol and (meth) acrylic acid are preferable. More preferably, it contains at least one polyfunctional monomer having three or more (meth)acryloyl groups in one molecule.

Examples thereof include pentaerythritol tetra(meth)acrylate, pentaerythritol tri(meth)acrylate, trimethylolpropane tri(meth)acrylate, ethylene oxide (EO)-modified trimethylolpropane tri(meth)acrylate, propylene oxide (PO)-modified trimethylolpropane tri(meth)acrylate, EO-modified phosphate tri(meth)acrylate, trimethylol ethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, caprolactone-modified dipentaerythritol hexa(meth)acrylate, 1,2,3-cyclohexane tetramethacrylate, polyurethane polyacrylate, polyester polyacrylate, and caprolactone-modified tris(acryloxyethyl) isocyanurate.

Specific compounds of polyfunctional acrylate-based compounds having (meth)acryloyl groups include esterified products of polyol and (meth)acrylic acid such as KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303 manufactured by Nippon Kayaku Co., Ltd., and V #3PA, V #400, V #36095D, V #1000, and V #1080 manufactured by Osaka Organic Chemical Industry Ltd. A trifunctional or higher functional urethane acrylate compound such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by Nippon Synthetic Chem Industry Co., Ltd.), UA-306H, UA-306I, UA-306T, and UL-503LN (manufactured by Kyoeisha Chemical Co., Ltd.), UNIDIC 17-806, UNIDIC 17-813, UNIDIC V-4030, and UNIDIC V-4000BA (manufactured by DIC Corporation), EB-1290K, EB-220, EB-5129, EB-1830, and EB-4858 (manufactured by Daicel-UCB Corporation), A-TMMT, A-TMPT, U-4HA, U-6HA, U-10HA, and U-15HA (manufactured by Shin Nakamura Chemical Co., Ltd.), HIGH-COAP AU-2010 and HIGH-COAP AU-2020 (manufactured by Tokushiki Co., Ltd.), ARONIX M-1960 (manufactured by Toagosei Co., Ltd.), ARTRESIN UN-3320HA, UN-3320HC, UN-3320HS, UN-904, and HDP-4T, trifunctional or higher functional polyester compounds such as ARONIX M-8100, M-8030, and M-9050 (manufactured by Toagosei Co., Ltd.), and KRM-8307 (manufactured by Daicel-Allnex Ltd.), and the like can be suitably used.

Examples thereof include a resin having three or more polymerizable functional groups, for example, a polyester resin having a relatively low molecular weight, a polyether resin, an acrylic resin, an epoxy resin, an urethane resin, an alkyd resin, a spiroacetal resin, a polybutadiene resin, and a polythiol polyene resin, or an oligomer or a prepolymer of a polyfunctional compound such as polyhydric alcohol.

Compounds disclosed in JP2005-076005A and JP2005-036105A, dendrimers such as SIRIUS-501 and SUBARU-501 (manufactured by Osaka Organic Chemical Industry Ltd.), and norbornene ring-containing monomers disclosed in JP2005-060425A can be used.

In order to obtain a strong film by bonding the metal oxide particle and the curable compound (a1) to each other, a silane coupling agent having a polymerizable functional group may be used as the curable compound (a1).

Specific examples of a silane coupling agent having a polymerizable functional group include 3-(meth)acryloxypropyltrimethoxy silane, 3-(meth)acryloxypropylmethyldimethoxy silane, 3-(meth)acryloxypropyldimethylmethoxy silane, 3-(meth)acryloxypropylmethyldiethoxy silane, 3-(meth)acryloxypropyl triethoxy silane, 2-(meth)acryloxyethyltrimethoxy silane, 2-(meth)acryloxyethyltriethoxy silane, 4-(meth)acryloxybutyltrimethoxy silane, and 4-(meth)acryloxybutyltriethoxy silane. Specific examples thereof include KBM-503 and KBM-5103 (manufactured by Shin-Etsu Chemical Co., Ltd.), silane coupling agents X-12-1048, X-12-1049, and X-12-1050 (manufactured by Shin-Etsu Chemical Co., Ltd.) disclosed in JP2014-123091A, and a compound C3 represented by the following structural formula.

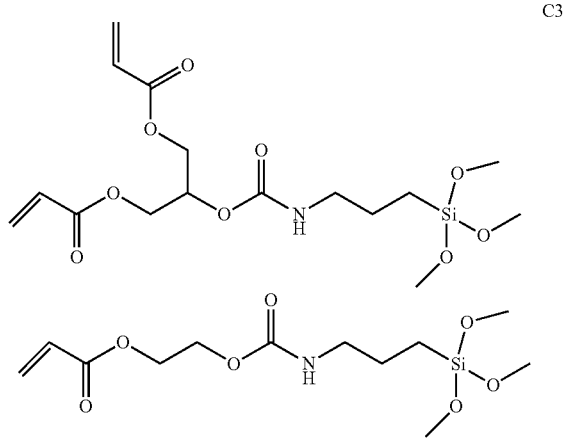

C3

Two or more types of the compounds having a polymerizable functional group may be used in combination. The polymerization of these compounds having a polymerizable functional group can be performed by irradiation with ionizing radiation or heating under the presence of a photo-radical initiator or a thermal radical initiator.

As the binder compound, the antireflection layer can further include a compound in addition to the curable compound (a1).

Since permeation into a pressure sensitive adhesive layer described below become easy, as the curable compound (a1), a compound having two or less polymerizable functional groups in one molecule may be used. Particularly, it is preferable that the compound having three or more polymerizable functional groups in one molecule and a compound having two or less polymerizable functional groups in one molecule or a compound not having a polymerizable functional group as a compound other than the curable compound (a1) are used in combination.

The compound having two or less polymerizable functional groups in one molecule or a compound not having a polymerizable functional group is preferably a compound in which a weight-average molecular weight (Mwa) is 40<Mwa<500 and an SP value (Spa) by the Hoy method is 19<SPa<24.5, since the compound is easily permeated to the pressure sensitive adhesive layer. The compound having two or less polymerizable functional groups in one molecule is preferably a compound having one polymerizable functional group in one molecule.

The SP value (solubility parameter) in the present invention is a value calculated by the Hoy method, and the Hoy method is disclosed in POLYMER HANDBOOK FOURTH EDITION.

The viscosity of the compound having two or less polymerizable functional groups in one molecule or the compound not having a polymerizable functional group at 25° C. is preferably 100 mPas or less, more preferably 1 to 50 mPas, and even more preferably 1 to 20 mPas. The compound in this viscosity range is preferable since the compound easily permeate pressure sensitive adhesive layer and also works so as to suppress aggregation of the particle (a2) such that haze and muddiness can be suppressed. Particularly, the aggregation of the particle (a2) can be suppressed by curing a portion of the curable compound (a1) before a pressure sensitive adhesive layer is laminated as described below, but it is preferable to use a compound in the viscosity range, since even in a case where curing is progressed, a compound having two or less polymerizable functional groups in one molecule or a compound not having a polymerizable functional group can be caused to be sufficiently permeated to the pressure sensitive adhesive layer. Particularly, it is preferable that the compound is in the viscosity range of 1 to 20 mPas, since an effect of the increase of the reflectance or the decrease of the total light transmittance which is obtained by clogging a gap of the particle with the binder is great.

The compound having two or less polymerizable functional groups in one molecule preferably has a (meth)acryloyl group, an epoxy group, an alkoxy group, a vinyl group, a styryl group, and an allyl group as the polymerizable functional group.

As the compound not having a polymerizable functional group, an ester-based compound, an amine-based compound, an ether-based compound, an aliphatic alcohol-based compound, a hydrocarbon-based compound, and the like can be preferably used, and an ester-based compound is particularly preferable. More specific examples thereof include dimethyl succinate (SP value: 20.2, viscosity 2.6 mPas), diethyl succinate (SP value: 19.7, viscosity 2.6 mPas), dimethyl adipate (SP value: 19.7, viscosity 2.8 mPas), dibutyl succinate (SP value: 19.1, viscosity: 3.9 mPas), bis(2-butoxyethyl) adipate (SP value: 19.0, viscosity 10.8 mPas), dimethyl suberate (SP value: 19.4, viscosity: 3.7 mPas), diethyl phthalate (SP value: 22.3, viscosity: 9.8 mPas), dibutyl phthalate (SP value: 21.4, viscosity 13.7 mPas), triethyl citrate (SP value: 22.5, viscosity 22.6 mPas), acetyl triethyl citrate (SP value: 21.1, viscosity 29.7 mPas), and diphenyl ether (SP value: 21.4, viscosity 3.8 mPas).

The content of the binder resin included in the antireflection layer is preferably 100 mg/m$^2$ to 800 mg/m$^2$, more preferably 100 mg/m$^2$ to 600 mg/m$^2$, and most preferably 100 mg/m$^2$ to 400 mg/m$^2$.

<Metal Oxide Particle>

The metal oxide particle is also referred to as the "particle (a2)".

Examples of the metal oxide particle include a silica particle, a titania particle, a zirconia particle, and an antimony pentoxide particle. Since the refractive index is close to many binder resins, haze is hardly generated and the moth eye structure is easily formed. Therefore, a silica particle is preferable.

The average primary particle diameter of the metal oxide particle is preferably 100 nm to 190 nm, more preferably 100 nm to 180 nm, and even more preferably 100 nm to 170 nm. In a case where the average primary particle diameter is the lower limit value or more, it the suppressing effect of the reflection of the visible light can be increased, and in a case where the average primary particle diameter is the upper limit value or less, the average value X of the distance A between peaks of the adjacent protrusions of the uneven shape can be easily caused to be 190 nm or less.

Only one kind of the metal oxide particle may be used singly, or two or more kinds of particles having different average primary particle diameters may be used.

The average primary particle diameter of the metal oxide particle refers to the cumulative 50% particle diameter of the volume-average particle diameter. A scanning electron microscope (SEM) can be used to measure the particle diameter. A powder particle (in a case of a dispersion liquid, ones obtained by volatilizing a solvent by drying) is observed at the appropriate magnification (about 5000 times) by SEM observation, the diameter of each of 100 primary particles is measured, the volume thereof is calculated, and the cumulative 50% particle diameter can be taken as the average primary particle diameter. In a case where the particle is not spherical, the average value of the long diameter and the short diameter is regarded as the diameter of the primary particle. In a case where the particles contained in the antireflection film are measured, it is calculated by observing the antireflection film from the front surface side by SEM in the same manner as described above. In this case, for easier observation, carbon vapor deposition, an etching treatment, and the like may be suitably applied to the sample.

It is preferable that the metal oxide particle is a solid particle in view of strength. A shape of the metal oxide particle is most preferably a spherical shape, but may be a shape other than a spherical shape such as an amorphous shape.

It is preferable that an amorphous particle in which a portion of a spherical metal oxide particle becomes a flat portion is used, and the flat portion is placed on the underlayer side, since the movement of the particle and the particle aggregation in each step from coating to curing through drying can be suppressed, such that the distance between protrusions by the particles can be caused to be even, and the transmittance of the short wavelength range can be improved.

As another example of the amorphous shape, a particle having a shape in which fine particles are further bonded to a portion of the metal oxide particles can be used. A plurality of fine particles may be bonded to the metal oxide particle, but it is more preferable that one fine particle is bonded. The particle diameter of the fine particle that is bonded to a portion of the metal oxide particle is preferably smaller than the metal oxide particle, more preferably 0.5 times or less, and even more preferably 0.25 times or less of the particle diameter of the metal oxide particle. The density of the fine particles that are bonded to a portion of the metal oxide particles is preferably greater than that of the metal oxide particle, more preferably 2 times or more, and even more preferably 3 times or more. The fine particle is preferably a metal oxide, and for example, zirconia, alumina, and titania are preferable, but any one can be appropriately used as long as the relationship of the density is satisfied. For example, particles obtained by adhering zirconia particles having a particle diameter of 40 nm to silica particles having a particle diameter of 160 nm are preferable.

The silica particle may be crystalline or amorphous.

As the metal oxide particle, a surface-treated inorganic fine particle is preferably used for improving the dispersibility in the coating liquid, improving the film hardness, and preventing aggregation. Specific examples and preferable examples of the surface treatment method are the in the same manner as those described in [0119] to [0147] of JP2007-298974A.

Particularly, in view of binding properties to the curable compound (a1) for forming the binder resin and improving the strength of the antireflection layer, it is preferable that the particle surface is surface-modified with a compound having a polymerizable unsaturated group (preferably an unsaturated double bond) and a functional group having reactivity with the particle surface, and the polymerizable unsaturated group (preferably an unsaturated double bond) is provided to the particle surface. As the compound used in the surface modification, a silane coupling agent having a polymerizable functional group described above as the curable compound (a1) can be appropriately used.

Specifically, it is preferable to modify metal oxide particle surfaces with commercially available KBM-503 and KBM-5103 (all manufactured by Shin-Etsu Chemical Co., Ltd.), and (meth)acryloyl group-containing silane coupling agents such as X-12-1048, X-12-1049, and X-12-1050 disclosed in JP2014-123091A.

As Specific examples of the particle having an average primary particle diameter of 100 nm to 190 nm, SEAHOSTAR KE-P10 (amorphous silica manufactured by Nippon Shokubai Co., Ltd. having an average primary particle diameter of 150 nm) can be preferably used.

Since the amount of hydroxyl groups on the surface is moderately large and the particle is hard, the metal oxide particle is particularly preferably a calcined silica particle.

The calcined silica particle can be manufactured by a well-known technique of hydrolyzing and condensing a hydrolyzable silicon compound in an organic solvent including water and a catalyst to obtain a silica particle and calcining the silica particle, and, for example, JP2003-176121A and JP2008-137854A can be referred to.

The silicon compound as a raw material for manufacturing the calcined silica particle is not particularly limited, and examples thereof include a chlorosilane compound such as tetrachlorosilane, methyltrichlorosilane, phenyltrichlorosilane, dimethyldichlorosilane, diphenyldichlorosilane, methyl vinyl dichlorosilane, trimethylchlorosilane, and methyl diphenylchlorosilane; an alkoxy silane compound such as tetramethoxy silane, tetraethoxy silane, tetraisopropoxy silane, tetrabutoxy silane, methyltrimethoxy silane, methyltriethoxy silane, trimethoxyvinylsilane, triethoxyvinylsilane, 3-glycidoxypropyltrimethoxy silane, 3-chloropropyltrimethoxy silane, 3-mercaptopropyltrimethoxy silane, 3-(2-aminoethylamino) propyltrimethoxy silane, phenyltrimethoxy silane, phenyltriethoxy silane, dimethyl dimethoxy silane, dimethyl diethoxy silane, 3-glycidoxypropylmethyldimethoxy silane, 3-glycidoxypropylmethyldiethoxy silane, 3-chloropropylmethyldimethoxy silane, diphenyldimethoxy silane, diphenyldiethoxy silane, dimethoxydiethoxy silane, trimethylmethoxy silane, and trimethylethoxy silane; an acyloxy silane compound such as tetraacetoxy silane, methyl triacetoxy silane, phenyl triacetoxy silane, dimethyl diacetoxy silane, diphenyl diacetoxy silane, and trimethylacetoxy silane; and a silanol compound such as dimethylsilanediol, diphenylsilanediol, and trimethylsilanol. Among the exemplary silane compounds, an alkoxy silane compound is particularly preferable, since alkoxy silane compound can be obtained more easily and halogen atoms as impurities in the obtained calcined silica particle are not included. As a preferred embodiment of the calcined silica particle, it is preferable that the content of halogen atoms is substantially 0%, and halogen atoms are not detected.

The calcining temperature is not particularly limited, but is preferably 800° C. to 1,300° C. and more preferably 1,000° C. to 1,200° C.

As an example of the method of manufacturing the amorphous particle, adjacent particles are sintered in a case of high temperature calcining, and the sintered particles are pulverized in a pulverizing step, so as to obtain amorphous particles in which a portion of the spherical shape is flat.

The content of the metal oxide particle in the antireflection layer is preferably 50 mg/m$^2$ to 200 mg/m$^2$, more preferably 100 mg/m$^2$ to 180 mg/m$^2$, and most preferably 130 mg/m$^2$ to 170 mg/m$^2$. In a case where the content is the lower limit or more, a large number of protrusions of the moth eye structure can be formed, and thus the antireflection properties are more easily improved. In a case where the content is the upper limit or less, aggregation hardly occurs and a satisfactory moth eye structure is easily formed.

It is preferable that only one kind of the monodispersed silica fine particle in which an average primary particle diameter of the metal oxide particle is 100 nm to 190 nm and a coefficient of variation (CV) value is less than 5% is contained, since the height of the unevenness of the moth eye structure becomes uniform and the reflectance is further decreased. The CV value is usually measured using a laser diffraction type particle diameter determination device, but other particle diameter measuring methods may be used, or particle size distribution can be calculated and obtained from the surface SEM image of the antireflection layer by image analysis. The CV value is more preferably less than 4%.

In another aspect, the metal oxide fine particle preferably includes both of metal oxide fine particles having an average primary particle diameter of 100 nm to 190 nm and metal oxide particles having an average primary particle diameter of 1 nm or more and less than 70 nm. In this case, the particles having a larger particle diameter mainly contribute to the moth eye structure, the particles having a smaller particle diameter are mixed between the larger particles, such that the aggregation between larger particles is suppressed, and as a result, the reflectance and the haze are improved. Since the metal oxide particles having a primary particle diameter of 1 nm or more and less than 70 nm are more immersed in the binder, the protrusions in the antireflection layer are formed by the metal oxide fine particles having a primary particle diameter of 100 nm to 190 nm. The frequency of the number of metal oxide particles having an average primary particle diameter of 1 nm or more and less than 70 nm with respect to the metal oxide fine particles having an average primary particle diameter of 100 nm to 190 nm is preferably the frequency of 1 to 3 times. According to this range, the aggregation suppress effect becomes high, and the reflectance can be decreased. It is preferable that the metal oxide particles having an average primary particle diameter of 1 nm to 70 nm have an average primary particle diameter of 30 nm to 50 nm, since the reflectance can be particularly decreased. In a case where metal oxide particles having different average primary particle diameters are used in combination, it is preferable to cause amounts of hydroxyl groups on the surfaces of both particles to close to each other, since aggregation becomes difficult. Here, since the metal oxide particles having an average primary particle diameter of 1 nm or more and less than 100 nm is mainly used for restraining the aggregation of the metal oxide particles having an average primary particle diameter of 100 nm to 190 nm and separating the metal oxide particles, commercially available metal oxide particles having an amount of hydroxyl groups of more than $1.00 \times 10^{-1}$ or having an indentation hardness of less than 400 MPa.

The antireflection layer may contain a component in addition to the binder resin and the metal oxide particle, and examples thereof include a dispersing agent of the metal oxide particle, a leveling agent, and an antifouling agent.

<Dispersing Agent of Metal Oxide Particle>

The dispersing agent of the metal oxide particle lowers the cohesive force between the particles such that the metal oxide particle can be easily disposed in a uniform manner. The dispersing agent is not particularly limited, but an anionic compound such as sulfuric acid salt and phosphoric acid salt, a cationic compound such as aliphatic amine salt and quaternary ammonium salt, a nonionic compound, and a polymer compound are preferable, and a polymer compound is more preferable since the polymer compound has a high degree of freedom in selecting adsorptive groups and steric repulsive groups. As the dispersing agent, a commercially available product can be used. Examples thereof include DISPERBYK160, DISPERBYK161, DISPERBYK162, DISPERBYK163, DISPERBYK164, DISPERBYK166, DISPERBYK167, DISPERBYK171, DISPERBYK180, DISPERBYK182, DISPERBYK2000, DISPERBYK2001, DISPERBYK2164, Bykumen, BYK-2009, BYK-P104, BYK-P104S, BYK-220S, Anti-Terra203, Anti-Terra204, and Anti-Terra205 (all are trade names) manufactured by BYK Japan KK.

<Leveling Agent>

The leveling agent lowers the surface tension of the antireflection layer, such that the liquid after coating is stabilized and the curable compound (a1) and the metal oxide particle can be easily disposed in a uniform manner.

A composition for forming the antireflection layer used in the present invention can contain at least one leveling agent.

Accordingly, it is possible to suppress film thickness unevenness and the like caused by drying unevenness due to local distribution of drying air, to improve cissing of a coated product, or to easily dispose the curable compound (a1) and the metal oxide particle in a uniform manner.

As the leveling agent, specifically, at least one leveling agent selected from a silicone-based leveling agent or a fluorine-based leveling agent can be used. The leveling agent is preferably an oligomer or a polymer rather than a low molecular compound.

In a case where a leveling agent is added, a leveling agent rapidly moves to the surface of the applied coating film and is unevenly distributed, and thus the leveling agent is unevenly distributed on the surface as it is even after the coating film is dried. Therefore, the surface energy of the film to which the leveling agent is added decreases due to the leveling agent. In view of preventing film thickness unevenness, cissing, and unevenness, it is preferable that the surface energy of the film is low.

Preferable examples of the silicone-based leveling agent include a polymer or an oligomer including a plurality of dimethylsilyloxy units as repeating units and having substituents at a terminal and/or a side chain. A polymer or an oligomer including dimethylsilyloxy as repeating units may include a structural unit in addition to dimethylsilyloxy. The substituent may be identical to or different from each other and it is preferable to include a plurality of substituents. Examples of preferred substituents include groups including a polyether group, an alkyl group, an aryl group, an aryloxy group, an aryl group, a cinnamoyl group, an oxetanyl group, a fluoroalkyl group, a polyoxyalkylene group, or the like.

The number-average molecular weight of the silicone-based leveling agent is not particularly limited, and the number-average molecular weight is preferably 100,000 or less, more preferably 50,000 or less, particularly preferably 1,000 to 30,000, and most preferably 1,000 to 20,000.

Examples of preferable silicone-based leveling agents include X22-3710, X22-162C, X22-3701E, X22160AS, X22170DX, X224015, X22176DX, X22-176F, X224272, KF8001, and X22-2000 manufactured by Shin-Etsu Chemical Co., Ltd.; FM4421, FM0425, FMDA26, FS1265, and the like manufactured by Chisso Corporation; BY16-750, BY16880, BY16848, SF8427, SF8421, SH3746, SH8400, SF3771, SH3749, SH3748, and SH8410 manufactured by Dow Corning Corporation; and TSF series (TSF4460, TSF4440, TSF4445, TSF4450, TSF4446, TSF4453, TSF4452, TSF4730, TSF4770, and the like), FGF502, SILWET series (SILWETL77, SILWETL2780, SILWETL7608, SILWETL7001, SILWETL7002, SILWETL7087, SILWETL7200, SILWETL7210, SILWETL7220, SILWETL7230, SILWETL7500, SILWETL7510, SILWETL7600, SILWETL7602, SILWETL7604, SILWETL7604, SILWETL7605, SILWETL7607, SILWETL7622, SILWETL7644, SILWETL7650, SILWETL7657, SILWETL8500, SILWETL8600, SILWETL8610, SILWETL8620, and SILWETL720) manufactured by Momentive Performance Materials Inc. as commercially available silicone-based leveling agents not having an ionizing radiation curing group, but the present invention is not limited thereto.

Examples of the silicone-based leveling agents having ionizing radiation curing groups include X22-163A, X22-173DX, X22-163C, KF101, X22164A, X24-8201, X22174DX, X22164C, X222426, X222445, X222457, X222459, X22245, X221602, X221603, X22164E, X22164B, X22164C, X22164D, and TM0701 manufactured by Shin-Etsu Chemical Co., Ltd., Silaplane series (FM0725, FM0721, FM7725, FM7721, FM7726, FM7727, and the like) manufactured by Chisso Corporation; SF8411, SF8413, BY16-152D, BY16-152, BY16-152C, 8388A, and the like manufactured by Dow Corning Corporation; TEGO-Rad2010, 2011, 2100, 2200N, 2300, 2500, 2600, 2700, and the like manufactured by Evonik Japan Co., Ltd.; BYK3500 manufactured by BYK Japan K.K.; KNS5300 manufactured by Shin-Etsu Chemical Co., Ltd.; and UVHC1105, UVHC8550, and the like manufactured by Momentive Performance Materials Inc., but the present invention is not limited thereto.

The content of the leveling agent is preferably 0.01 to 5.0 mass %, more preferably 0.01 to 2.0 mass %, and most preferably 0.01 to 1.0 mass % in the antireflection layer.

The fluorine-based leveling agent is a compound of a fluoroaliphatic group and an amphipathic group that contributes to affinity for various compositions for coating or molding materials, and the like in a case where this leveling agent is used as an additive in the same molecule, and this compound can generally be obtained by copolymerizing a monomer having a fluoroaliphatic group and a monomer having an amphipathic group.

Representative examples of the monomer having an amphipathic group copolymerized with a monomer having a fluoroaliphatic group include poly(oxyalkylene) acrylate and poly(oxyalkylene) methacrylate.

As preferable commercially available fluorine-based leveling agents, examples of the leveling agent not having an ionizing radiation curing group include MEGAFACE series (MCF350-5, F472, F476, F445, F444, F443, F178, F470, F475, F479, F477, F482, F486, TF1025, F478, F178K, F-784-F, and the like) manufactured by DIC Corporation; and FTERGENT series (FTX218, 250, 245M, 209F, 222F, 245F, 208G, 218G, 240G, 206D, 240D, and the like) manufactured by NEOS Co., Ltd., and examples of the leveling agent having an ionizing radiation curing group include OPTOOL DAC manufactured by Daikin Industries, Ltd.; and DEFENSA series (TF3001, TF3000, TF3004, TF3028, TF3027, TF3026, TF3025, and the like) and RS series (RS71, RS101, RS102, RS103, RS104, RS105, and the like) manufactured by DIC Corporation, but the present invention is not limited thereto.

Compounds disclosed in JP2004-331812A and JP2004-163610A can be used.

<Antifouling Agent>

For the purpose of providing characteristics such as antifouling properties, water resistance, chemical resistance, and sliding properties, well-known silicone-based or fluorine-based antifouling agent, lubricant, or the like can be appropriately added to the antireflection layer.

As the specific examples of the silicone-based or fluorine-based antifouling agent, leveling agents having an ionizing radiation curing group among the silicone-based or fluorine-based leveling agents described above can be appropriately used, but the present invention is not limited thereto.

The content of the antifouling agent is preferably 0.01 to 5.0 mass %, more preferably 0.01 to 2.0 mass %, and most preferably 0.01 to 1.0 mass % in the antireflection layer.

[Hard Coat Layer]

The antireflection film according to the embodiment of the present invention may have another layer between the plastic substrate and the antireflection layer. As the other layer, a hard coat layer is preferable.

As described below, the antireflection film according to the embodiment of the present invention is preferably an antireflection film including a quaternary ammonium salt-containing polymer in a hard coat layer, a common logarithm value (log SR) of the surface resistivity SR (Ω/sq) of the antireflection layer is 11 or less, and in a case where an average value of the distances A between peaks of adjacent protrusions is X, and a standard deviation representing distribution of A is σ, the uneven shape of the antireflection layer satisfies $X+\sigma \leq 190$ nm.

The hard coat layer is preferably formed by a crosslinking reaction or a polymerization reaction of a curable compound (preferably an ionizing radiation curable compound) which is a compound having a polymerizable group. That is, the hard coat layer preferably includes a cured product of the curable compound. For example, the hard coat layer can be formed by coating the plastic substrate with a composition for forming a hard coat layer including an ionizing radiation curable polyfunctional monomer or a polyfunctional oligomer and subjecting the polyfunctional monomer or the polyfunctional oligomer to crosslinking reaction or polymerization reaction.

As the functional group (polymerizable group) of the ionizing radiation curable polyfunctional monomer or polyfunctional oligomer, those having light, electron beams, or radiation polymerizability are preferable. Among them, a photopolymerizable functional group is preferable.

Examples of the photopolymerizable functional group include unsaturated polymerizable functional groups such as a (meth)acryloyl group, a vinyl group, a styryl group, and an allyl group. Among them, a (meth)acryloyl group is preferable.

Specifically, a compound which is the same as the curable compound (a1) described above can be used as the curable compound for forming the hard coat layer.

Particularly, in a case where a thin plastic substrate having a thickness of 20 to 40 μm is used, in view of suppressing the occurrence of curling and wrinkling, a compound having an epoxy group in a molecule may be further used as a curable compound for forming a hard coat layer. The molecular weight of the compound having an epoxy group in a molecule is not particularly limited, and a monomer, an oligomer, or a polymer can be suitably used. In view of maintaining the surface hardness of the antireflection film, it is preferable that the compound having an epoxy group further includes a polymerizable unsaturated group in a molecule. Examples of the compound having a polymerizable unsaturated group and an epoxy group in a molecule include CYCLOMER M100 manufactured by DAICEL Corporation, but the present invention is not limited thereto.

The content of the compound having an epoxy group in a molecule in the hard coat layer is preferably 12 to 45 mass % and more preferably 15 to 35 mass %.

In view of applying sufficient durability and impact resistance in a film, the thickness of the hard coat layer is usually about 0.6 μm to 50 μm and preferably 4 μm to 20 μm.

The strength of the hard coat layer is preferably H or more and more preferably 2H or more in a pencil hardness test. Further, in the Taber test according to JIS K5400, it is more preferable in a case where an abrasion amount of a test piece before and after the test is smaller.

In a case where the antireflection film is cut with a microtome and the cross section was analyzed with a time-of-flight secondary ion mass spectrometer (TOF-SIMS), the hard coat layer can be measured as a portion in which a cured product of the ionizing radiation curable compound is detected, and the film thickness of this area can also be measured from the cross-sectional information of the TOF-SIMS in the in the same manner.

The hard coat layer can be measured, for example, by detecting another layer between the plastic substrate and the antireflection layer by observing the cross section by a reflective spectroscopic film thickness meter or a transmission electron microscope (TEM) by using light interference. As the reflective spectroscopic film thickness meter, FE-3000 (manufactured by Otsuka Electronics Co., Ltd.) or the like can be used.

According to the present invention, it is preferable that the step (1) is performed on a hard coat layer in a half-cured state. In a case where the hard coat layer is caused to be a half-cured state, it is possible to obtain effects of improving the adhesiveness between the hard coat layer and the antireflection layer and suppressing aggregation of metal oxide particles by the bonding formation between the hard coat layer and the metal oxide particle in which an unsaturated double bond is provided on a surface.

For example, in a case where the coating film is ultraviolet curable, the hard coat layer can be half-cured by appropriately adjusting the oxygen concentration in a case of curing and the ultraviolet irradiation amount. It is preferable that the coating film is cured by being irradiated with ultraviolet rays in an irradiation amount of 1 mJ/cm$^2$ to 300 mJ/cm$^2$ by an ultraviolet lamp. The irradiation amount is more preferably 5 mJ/cm$^2$ to 100 mJ/cm$^2$ and still more preferably 10 mJ/cm$^2$ to 70 mJ/cm$^2$. At the time of irradiation, the energy may be applied at once or can be applied in a divided manner. As the ultraviolet lamp type, a metal halide lamp, a high pressure mercury lamp, or the like is suitably used.

The oxygen concentration at the curing is preferably 0.05 to 5.0 vol %, more preferably 0.1 to 2 vol %, and most preferably 0.1 to 1 vol %.

(Solvent)

The composition for forming a hard coat layer preferably includes a solvent.

It is preferable to include a solvent having permeability to a plastic substrate as the solvent, in view of adhesiveness between the plastic substrate and the hard coat layer. The solvent having permeability to a plastic substrate is a solvent having solubility to a plastic substrate. Here, the solvent having solubility to a plastic substrate means a solvent that completely dissolves the plastic substrate and causes the shape thereof to be lost in a case where a plastic substrate having a size of 24 mm×36 mm (thickness 80 μm) is introduced to a 15 ml bottle including the above solvent and is caused to stand at room temperature (25° C.) for 24 hours, and the bottle or the like is appropriately shaken.

As the permeable solvent in a case of using a cellulose acylate film as the plastic substrate, methyl ethyl ketone (MEK), dimethyl carbonate, methyl acetate, acetone, and methylene chloride are preferable, and methyl ethyl ketone (MEK), dimethyl carbonate, and methyl acetate can be more preferably used, but the present invention is not limited thereto.

The composition for forming a hard coat layer may include a solvent in addition to the permeable solvent (for example, ethanol, methanol, 1-butanol, isopropanol (IPA), methyl isobutyl ketone (MIBK), and toluene).

In the composition for forming a hard coat layer, the content of the permeable solvent is preferably 50 mass % to 100 mass % and more preferably 70 mass % to 100 mass % with respect to the total mass of the solvent included in the composition for forming a hard coat layer.

In a case where the composition for forming a hard coat layer includes a quaternary ammonium salt-containing polymer, in view of compatibility to a quaternary ammonium salt-containing polymer, it is preferable to include a hydrophilic solvent as the solvent. As the hydrophilic solvent, lower alcohol such as methanol, ethanol, isopropanol (IPA), and butanol are preferable.

The solid content concentration of the composition for forming a hard coat layer is preferably 20 mass % to 70 mass % and more preferably 30 mass % to 60 mass %.

(Other Components)

In addition to the above components, a polymerization initiator, an antistatic agent, an antiglare agent and the like can be appropriately added to the composition for forming a hard coat layer. Various additives such as reactive or non-reactive leveling agents and various sensitizing agents may be mixed.

(Polymerization Initiator)

If necessary, radicals and cationic polymerization initiators and the like may be suitably selected to be used. These polymerization initiators are decomposed by light irradiation and/or heating to generate radicals or cations and promote radical polymerization and cationic polymerization.

Examples of the polymerization initiator include a polymerization initiator that may be included in a composition (A) for forming a layer (a) of the antireflection layer described below.

Particularly, in a case where the composition for forming a hard coat layer includes a quaternary ammonium salt-containing polymer, it is preferable to use a phosphine oxide-based polymerization initiator as the polymerization initiator. Since the phosphine oxide-based polymerization initiator has a photo bleaching effect, even in a case where the surface of the hard coat layer is in a half-cured state, the curing rate in the interior becomes higher than that in a case of using other initiators, mixture of the quaternary ammonium salt-containing polymer to the antireflection layer can be suppressed.

(Phosphine Oxide-Based Polymerization Initiator)

It is preferable that the phosphine oxide-based polymerization initiator generates n-π* transition in a case of absorbing light and has a photo bleaching effect, and specifically, preferable examples thereof include 2,4,6-trimethylbenzoyldiphenylphosphine oxide, and bis(2,4,6-trimethylbenzoyl)-phenylphosphine oxide.

Preferable examples of the commercially available phosphine oxide-based polymerization initiator include IRGACURE 819 and DAROCUR TPO manufactured by BASF SE.

The phosphine oxide-based polymerization initiator used in the present invention may be used singly, or two or more kinds thereof may be used in combination.

(Antistatic Agent)

As specific examples of the antistatic agent, antistatic agents well known in the related art such as quaternary ammonium salt, a conductive polymer, and conductive fine particles can be used, though the antistatic agents are particularly limited. However, in view of the low cost and the ease of handling, an antistatic agent having quaternary ammonium salt is preferable and a quaternary ammonium salt-containing polymer is more preferable.

In a case where the hard coat layer includes the quaternary ammonium salt-containing polymer, in a case where the quaternary ammonium salt-containing polymer is mixed into the antireflection layer, the metal oxide particle and the quaternary ammonium salt-containing polymer interact with each other so as to promote the aggregation of the metal oxide particle, and thus it is preferable that the quaternary ammonium salt-containing polymer is unevenly distributed on the substrate side of the hard coat layer. The method of unevenly distributing the quaternary ammonium salt-containing polymer is not limited, but examples thereof include a method of forming a hard coat layer by the lamination of a hard coat layer including a quaternary ammonium salt-containing polymer and a hard coat layer not having a quaternary ammonium salt-containing polymer or a method of using phase separation.

As the method of using phase separation, in a case where, due to use of a hydrophilic solvent (solvent having a boiling point of preferably 80° C. or higher and more preferably 90° C. to 140° C. at 101,325 Pa, and examples thereof include isopropanol and butanol) having a high boiling point or low temperature drying, drying becomes slow, the quaternary ammonium salt-containing polymer is unevenly distributed particularly inside of the hard coat layer, avoiding the hydrophobic air interface. In a case where the substrate is cellulose acylate, the substrate is hydrophilic, and thus is easily unevenly distributed inside the hard coat layer. Uneven distribution can be obtained also by the combination with a hydrophobic material in the hard coat layer. In the hydrophobic material, it is preferable that an SP value (SPb) is 19≤SPb≤21, and it is preferable that the hydrophobic material is a curable compound having a polymerizable unsaturated group in view of hardness. Specific examples thereof include DPCA-20 (SPb=20.6), DPCA-30 (SPb=20.6), and DPCA-60 (SPb=20.5) which are manufactured by Nippon Kayaku Co., Ltd., and A-TMMT (SPb=20.0) and A-TMPT (SPb=20.0) manufactured by Shin-Nakamura Chemical Co., Ltd.

It is preferable that, with respect to the antireflection film according to the embodiment of the present invention, the metal oxide particle to be used is a metal oxide particle to which a polymerizable unsaturated group is provided to a particle surface, a hard coat layer obtained by curing a composition for forming a hard coat layer including a curable compound having a polymerizable unsaturated group is provided, and bonding is formed between the metal oxide particle and the hard coat layer.

(Quaternary Ammonium Salt-Containing Polymer)

The quaternary ammonium salt-containing polymer can be appropriately selected from the well-known compounds, but in view of solubility to the coating liquid, a polymer having at least one of structural units represented by Formulae (I), (II), and (III) is preferable.

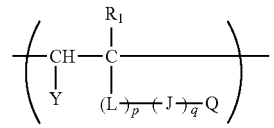

Formula (I)

In Formula (I), $R_1$ represents a hydrogen atom, an alkyl group, a halogen atom, or —$CH_2COO^-M^+$. Y represents a hydrogen atom or —$COO^-M^+$. $M^+$ represents a proton or a cation. L represents —CONH—, —COO—, —CO—, or —O—. J represents an alkylene group or an arylene group. Q represents a group selected from the group A.

A:

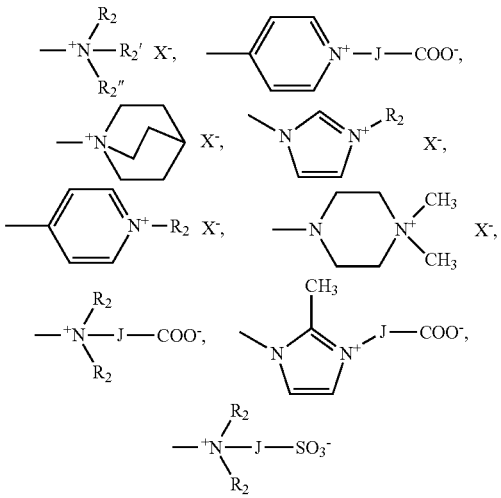

In the formula, $R_2$, $R_2'$, and $R_2''$ each independently represent alkyl groups. J represents an alkylene group or an arylene group. $X^-$ represents an anion. p and q each independently represent 0 or 1.

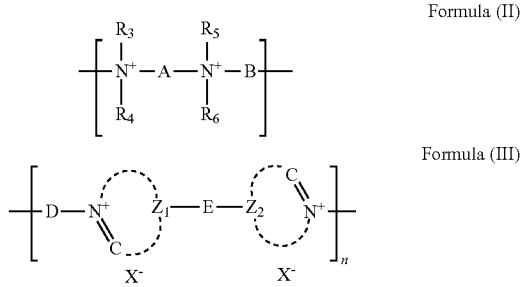

Formula (II)

Formula (III)

In Formulae (II) and (III), $R_3$, $R_4$, $R_5$, and $R_6$ each independently represent an alkyl group, and $R_3$ and $R_4$, and $R_5$ and $R_6$ may be bonded to each other to form a nitrogen-containing heterocyclic ring.

A, B, and D each independently represent an alkylene group, an arylene group, an alkenylene group, an arylene alkylene group, $-R_7COR_8-$, $-R_9COO_{10}OCOR_{11}-$, $-R_{12}OCR_{13}COOR_{14}-$, $-R_{15}-(OR_{16})_m-$, $-R_{17}CONHR_{18}NHCOR_{19}-$, $-R_{20}OCONHR_{21}NHCOR_{22}-$, or $-R_{23}NHCONHR_{24}NHCONHR_{25}-$. E represents a single bond, an alkylene group, an arylene group, an alkenylene group, an arylene alkylene group, $-R_7COR_8-$, $-R_9COOR_{10}OCOR_{11}-$, $-R_{12}OCR_{13}COOR_{14}-$, $-R_{15}-(OR_{16})_m-$, $-R_{17}CONHR_{18}NHCOR_{19}-$, $-R_{20}OCONHR_{21}NHCOR_{22}-$, $-R_{23}NHCONHR_{24}NHCONHR_{25}-$, or $-NHCOR_{26}CONH-$. $R_7$, $R_8$, $R_9$, $R_{11}$, $R_{12}$, $R_{14}$, $R_{15}$, $R_{16}$, $R_{17}$, $R_{19}$, $R_{20}$, $R_{22}$, $R_{23}$, $R_{25}$, and $R_{26}$ represent an alkylene group. $R_{10}$, $R_{13}$, $R_{18}$, $R_{21}$, and $R_{24}$ each independently represent a linking group selected from an alkylene group, an alkenylene group, an arylene group, an arylene alkylene group, and an alkylene arylene group. m represents a positive integer of 1 to 4. $X^-$ represents an anion.

$Z_1$ and $Z_2$ represent a nonmetallic atom group required for forming a 5-membered or 6-membered ring together with an $-N=C-$ group and may be connected to E in a form of quaternary salt forming $=N^+[X^-]-$.

n represents an integer of 5 to 300.

The groups of Formulae (I) to (III) are described.

Examples of the halogen atom include a chlorine atom and a bromine atom, and a chlorine atom is preferable.

The alkyl group is preferably a branched or linear alkyl group having 1 to 4 carbon atoms and more preferably a methyl group, an ethyl group, or a propyl group.

The alkylene group is preferably an alkylene group having 1 to 12 carbon atoms, more preferably a methylene group, an ethylene group, or a propylene group, and particularly preferably an ethylene group.

The arylene group is preferably an arylene group having 6 to 15 carbon atoms, more preferably phenylene, diphenylene, a phenyl methylene group, a phenyl dimethylene group, and a naphthylene group, and particularly preferably a phenyl methylene group, and these groups may have a substituent.

The alkenylene group is preferably an alkenylene group having 2 to 10 carbon atoms, the arylene alkylene group is preferably an arylene alkylene group having 6 to 12 carbon atoms, and these groups may have a substituent.

Examples of the substituent which may be substituted on each group include a methyl group, an ethyl group, and a propyl group.

In Formula (I), $R_1$ is preferably a hydrogen atom.

Y is preferably a hydrogen atom.

J is preferably a phenyl methylene group.

Q is preferably Formula (VI) selected from a group A, and $R_2$, $R_2'$, and $R_2''$ are respectively methyl groups.

Examples of $X^-$ include a halogen ion, a sulfonate anion, and a carboxylate anion. A halogen ion is preferable, and a chlorine ion is more preferable.

p and q are preferably 0 or 1 and more preferably p=0 or q=1.

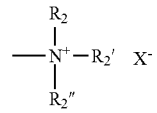

Formula (VI)

In Formulae (II) and (III), $R_3$, $R_4$, $R_5$, and $R_6$ preferably a substituted or unsubstituted alkyl group having 1 to 4 carbon atoms, more preferably a methyl group or an ethyl group, and particularly preferably a methyl group.

A, B, and D each independently and preferably represent a substituted or unsubstituted alkylene group having 2 to 10 carbon atoms, an arylene group, an alkenylene group, or an arylene alkylene group and is preferably a phenyl dimethylene group.

Examples of $X^-$ include a halogen ion, a sulfonate anion, and a carboxylate anion. A halogen ion is preferable, and a chlorine ion is more preferable.

E preferably represents a single bond, an alkylene group, an arylene group, an alkenylene group, or an arylene alkylene group.

Examples of a 5-membered or 6-membered ring formed by $Z_1$ and $Z_2$ together with an $-N=C-$ group include a diazoniabicyclooctane ring.

Specific examples of the compound having a unit with a structure represented by Formulae (I) to (III) are provided below, but the present invention is not limited thereto. Among subscripts (m, x, y, r, and actual numerical values) in the following specific examples, m represents the number of repeating units of each unit, and x, y, and r represent the molar ratio of respective units.

IP-1

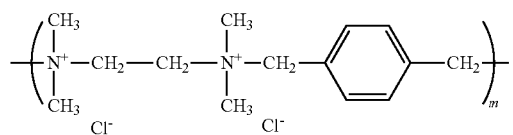

m ≈ 50

IP-2

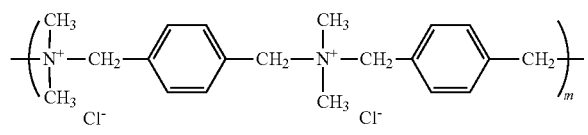

m ≈ 35

-continued
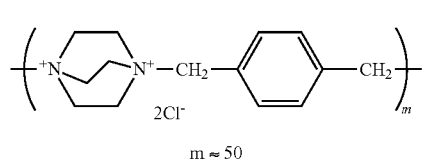
IP-3
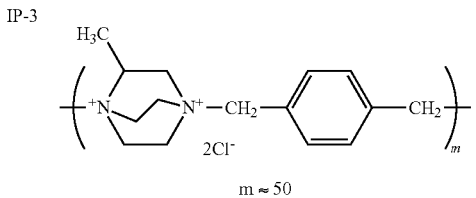
IP-4
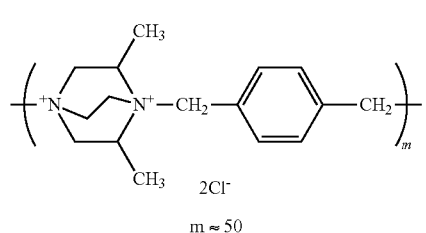
IP-5
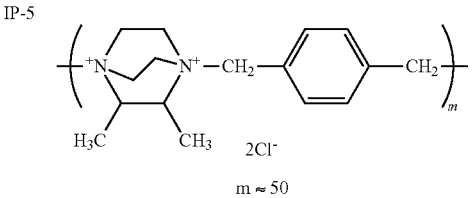
IP-6
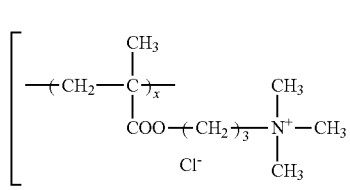
IP-7
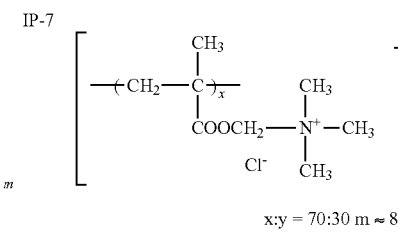
IP-8
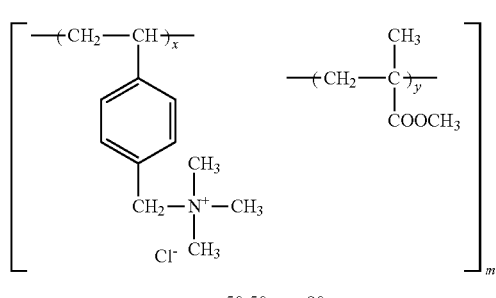
IP-9
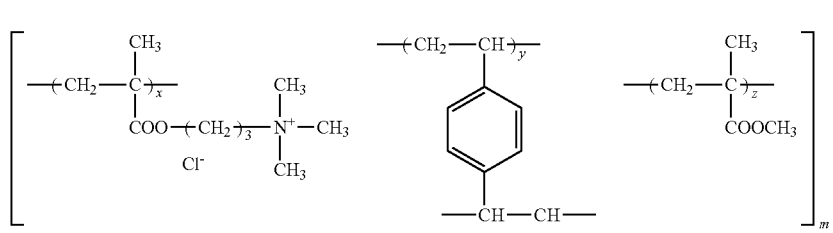
IP-10

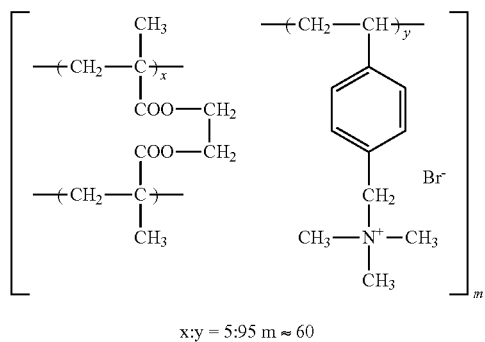

IP-11

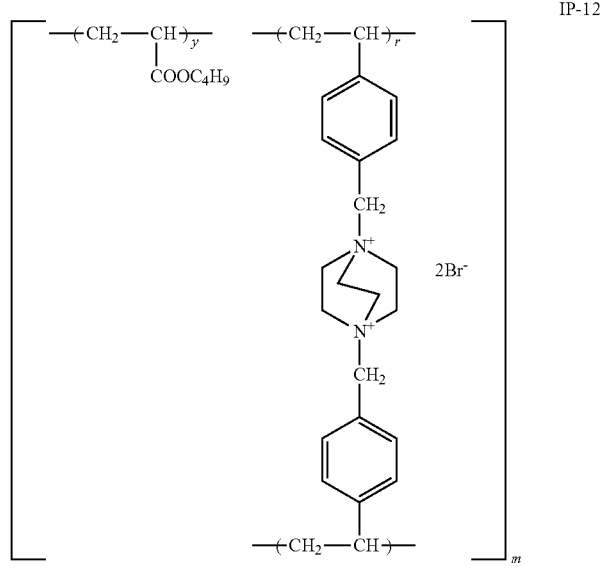

IP-12

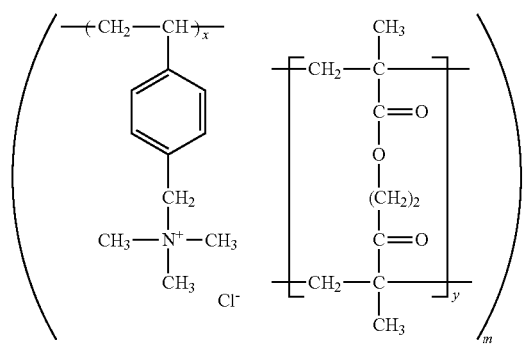

IP-13

The compounds exemplified above may be used singly or two or more kinds of the compound can be used in combination.

(Refractive Index Adjusting Agent)

For the purpose of controlling the refractive index of the hard coat layer, a high refractive index monomer or an inorganic particle can be added as a refractive index adjusting agent. In addition to the effect of controlling the refractive index, the inorganic particles also have an effect of suppressing curing shrinkage due to the crosslinking reaction. According to the present invention, after the hard coat layer is formed, a polymer generated by polymerizing the polyfunctional monomer and/or the high refractive index monomer or the like and inorganic particles dispersed therein are collectively referred to as a binder.

(Leveling Agent)

As specific examples of the leveling agent, leveling agents well-known in the related art such as fluorine-based or silicone-based leveling agents can be used. The composition for forming a hard coat layer to which the leveling agent is added can provide coating stability to the surface of the coating film in a case of coating or drying.

The antireflection film according to the embodiment of the present invention can be used in various applications, and, for example, the antireflection film can be suitably used as a polarizing plate protective film.

The polarizing plate protective film using the antireflection film according to the embodiment of the present invention can be bonded to a polarizer to form a polarizing plate and can be appropriately used in a liquid crystal display device or the like.

[Polarizing Plate]

The polarizing plate is a polarizing plate having a polarizer and at least one of the protective films for protecting the polarizer, and it is preferable that at least one of the protective films is the antireflection film according to the embodiment of the present invention.

The polarizer includes an iodine-based polarizer, a dye-based polarizer using a dichroic dye, and a polyene-based polarizer. The iodine-based polarizer and the dye-based polarizer can be generally manufactured by using a polyvinyl alcohol-based film.

[Antireflection Product]

The antireflection product according to the embodiment of the present invention is a product having the antireflection film according to the embodiment of the present invention on a surface. Examples thereof can be cover glass (an example of the antireflection product) to which an antireflection function is provided by applying the antireflection film according to the embodiment of the present invention to cover glass.

[Image Display Device]

The antireflection film according to the embodiment of the present invention can be also applied to an image display device.

Examples of the image display device include a display device using a cathode ray tube (CRT), a plasma display panel (PDP), an electroluminescent display (ELD), a vacuum fluorescent display (VFD), a field emission display (FED), and a liquid crystal display (LCD), and a liquid crystal display device is particularly preferable.

Generally, a liquid crystal display device has a liquid crystal cell and two polarizing plates disposed on both sides of the liquid crystal cell, and the liquid crystal cell carries a liquid crystal between the two electrode substrates. One optically anisotropic layer may be disposed between the liquid crystal cell and one polarizing plate, or two optically anisotropic layers may be disposed between the liquid crystal cell and both polarizing plates. As the liquid crystal cell, liquid crystal cells of various driving methods such as a Twisted Nematic (TN) mode, a Vertically Aligned (VA) mode, an Optically Compensatory Bend (OCB) mode, and an In-Plane Switching (IPS) mode can be applied.

[Module]

The module according to the embodiment of the present invention is a module which has two antireflection films according to the embodiment of the present invention and in which the two antireflection films are placed to face each other via an air gap (air layer).

The module according to the embodiment of the present invention is preferably a module in which antireflection layers of the two antireflection films are disposed closer to the air gap side than the plastic substrate.

Figure 2:
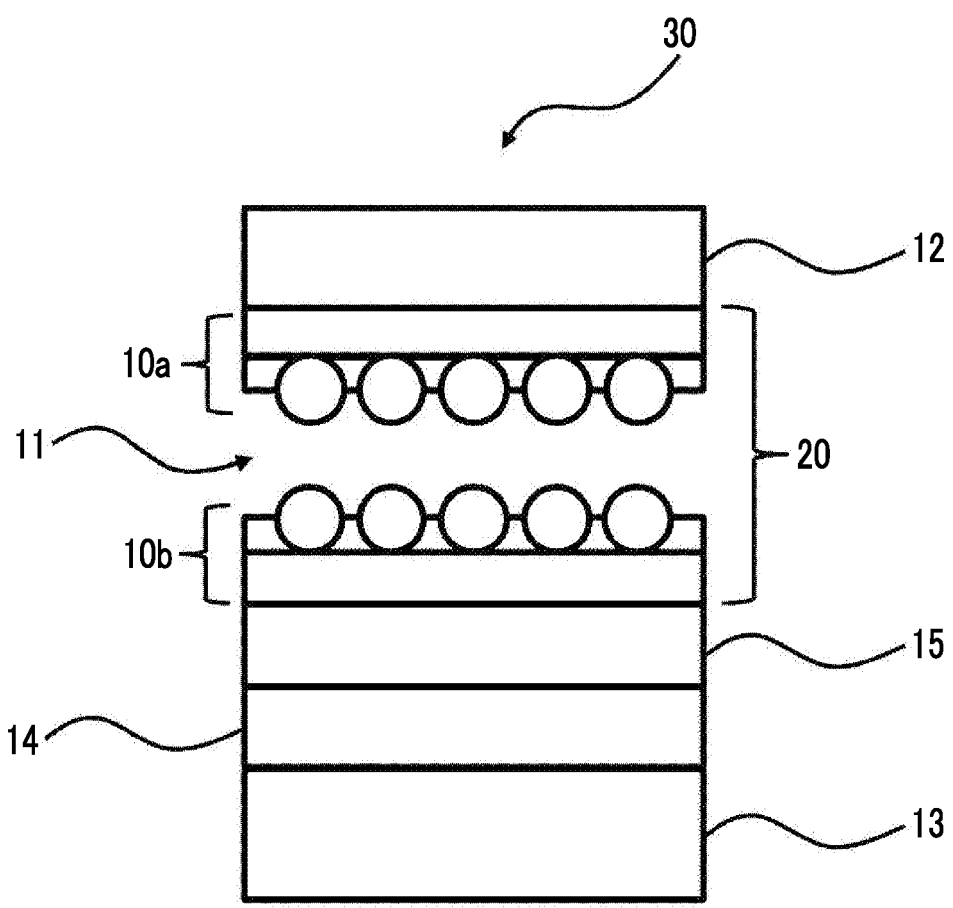
FIG. 2 is a schematic view for describing an example of a module and a liquid crystal display device with a touch panel according to the present invention.

FIG. 2 illustrates a schematic cross-sectional view of an example of a module according to the embodiment of the present invention. A module 20 of FIG. 2 has antireflection films 10a and 10b according to the embodiment of the present invention, and the two antireflection films are placed to face each other via an air gap 11. The antireflection layers of the two antireflection films 10a and 10b are respectively disposed closer to the air gap 11 side than the plastic substrate.

The module according to the embodiment of the present invention can be used in various applications, and can be used, for example, in a liquid crystal display device with a touch panel.

[Liquid Crystal Display Device with Touch Panel]

The liquid crystal display device with a touch panel according to the embodiment of the present invention is a liquid crystal display device with a touch panel including the module according to the embodiment of the present invention, having a touch panel on a side of the antireflection layer side of one antireflection film of the two antireflection films opposite to the plastic substrate, and having a liquid crystal cell on a side of the antireflection layer side of the other antireflection film opposite to the plastic substrate.

FIG. 2 illustrates the schematic cross-sectional view of an example of a liquid crystal display device with a touch panel according to the embodiment of the present invention. A liquid crystal display device 30 with a touch panel of FIG. 2 includes the module 20 according to the embodiment of the present invention, has a touch panel 12 on a side of the antireflection layer side of one antireflection film 10a of the two antireflection films opposite to the plastic substrate, and has a liquid crystal cell 13 on a side of the antireflection layer side of the other antireflection film 10b opposite to the plastic substrate. The antireflection film 10b also functions as a protective film of a polarizer 15. Another protective film 14 is provided on a side of the polarizer 15 opposite to the antireflection film 10b. A laminate of the antireflection film 10b, the polarizer 15, and the protective film 14 is also a polarizing plate according to the embodiment of the present invention.

The liquid crystal display device 30 with a touch panel according to the embodiment of the present invention can decrease reflection of external light incident from a side of the touch panel 12 opposite to the interface on the antireflection film 10a side by the antireflection film 10a and the antireflection film 10b. With respect to the antireflection film 10a and the antireflection film 10b according to the embodiment of the present invention, since the total light transmittance in a case of being incident from a side of the antireflection layer opposite to the plastic substrate is 88% or more, and transmittances of light at wavelengths of 480 nm and 580 nm in a case of being incident from a side of the antireflection layer opposite to the plastic substrate are respectively $T_{480}$ and $T_{580}$, $T_{580}-T_{480} \leq 3.5\%$ is satisfied, light from a backlight (not illustrated) is easily transmitted throughout the entire range of the visible light, and the tint change of a display image can be suppressed.

The touch panel, the liquid crystal cell, the protective film, and the polarizer that can be used are not particularly limited, and all kinds of well-known ones may be used.

For example, various types of touch panels such as a resistance film type, a capacitance type, an optical type, and an ultrasonic type can be used as the touch panel.

[Method of Manufacturing Antireflection Film]

The method of manufacturing the antireflection film according to the embodiment of the present invention is a method of manufacturing an antireflection film having, in this order:

a step (1) of providing a curable compound and a metal oxide particle having an average primary particle diameter of 100 nm to 190 nm on a plastic substrate, in a thickness in which the metal oxide particle is buried in a layer (a) including the curable compound;

a step (2) of bonding a layer (b) of a pressure sensitive film having a support and the layer (b) including a pressure sensitive adhesive having a gel fraction of 95.0% or more on the support to the layer (a);

a step (3) of moving a position of an interface between the layer (a) and the layer (b) to the plastic substrate side such that the metal oxide particle is buried in a layer obtained by combining the layer (a) and the layer (b) and protrudes from an interface of the layer (a) on a side opposite to an interface on the plastic substrate side;

a step (4) of curing the layer (a) in a state in which the metal oxide particle is buried in the layer obtained by combining the layer (a) and the layer (b); and a step (5) of peeling off the layer (b) from the layer (a).

According to the manufacturing method, the antireflection film according to the embodiment of the present invention can be manufactured.

In the manufacturing method, the aforementioned curable compound (a1) is preferably used as a curable compound, and the aforementioned metal oxide particles are also preferably used.

The layer (a) cured in the step (4) is corresponds to the film of the aforementioned binder resin, and a layer including the layer (a) and a metal oxide particle protruding from the layer (a) is an antireflection layer.

Figure 3:
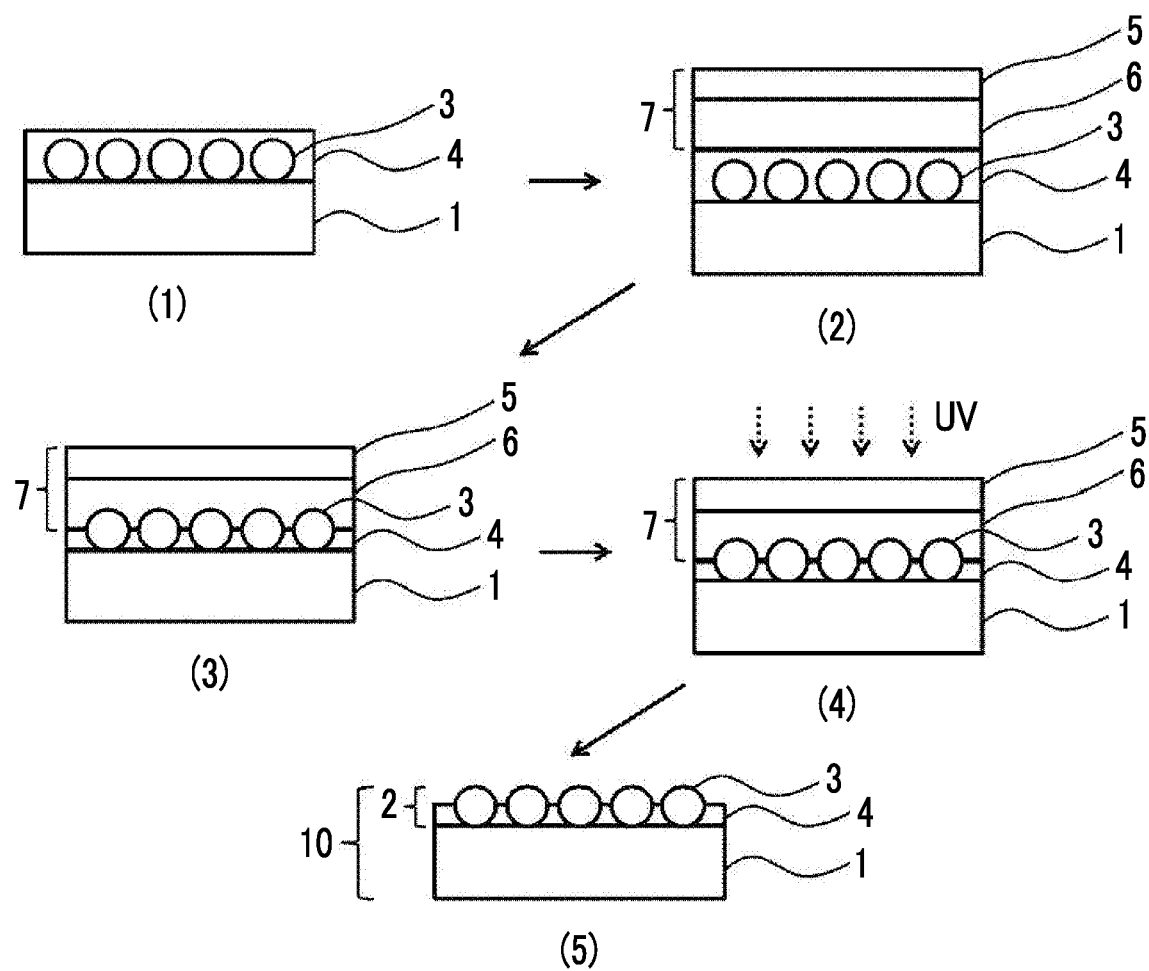
FIG. 3 is a schematic view for describing an example of a method of manufacturing an antireflection film of the present invention.

An example of a preferable embodiment of the method of manufacturing the antireflection film according to the embodiment of the present invention is illustrated in FIG. 3.

(1) of FIG. 3 schematically illustrates a state in which the metal oxide particle (also referred to as a "particle (a2)") (reference numeral 3 in FIG. 3) having an average primary particle diameter of 100 nm to 190 nm in the layer (a) (reference numeral 4 in FIG. 3) including the curable compound (a1) is provided on a plastic substrate 1 in the step (1) in a thickness in which the metal oxide particle is buried.

(2) in FIG. 3 schematically illustrates a state in which the layer (b) of the pressure sensitive film 7 having a support 5 and a layer (b) (reference numeral 6 in FIG. 3) including a pressure sensitive adhesive having a gel fraction of 95.0% or more on the support 5 is bonded to the layer (a) (reference numeral 4 in FIG. 3) in the step (2).

(3) of FIG. 3 schematically illustrates a state in which a position of an interface between the layer (a) and the layer (b) is moved to the plastic substrate side, such that the particle (a2) is buried in a layer obtained by combining the layer (a) and the layer (b) and protrudes from an interface on an opposite side of the interface of the layer (a) on the substrate side, in the step (3). As described below, examples of the method of moving a position of the interface between the layer (a) and the layer (b) to the plastic substrate side include a method of causing a portion of the curable compound (a1) to permeate the layer (b) including a pressure sensitive adhesive.

Moving the position of the interface between the layer (a) and the layer (b) to the plastic substrate side corresponds to causing the position of the interface to come close to the plastic substrate.

(4) of FIG. 3 schematically illustrates a case where the layer (a) is cured in a state in which the particle (a2) is buried in a layer obtained by combining the layer (a) and the layer (b) in the step (4).

(5) of FIG. 3 illustrates a state (antireflection film 10) after the pressure sensitive film 7 is peeled off in the step (5) of peeling off the pressure sensitive film 7 including the layer (b) from the layer (a).

In the method of manufacturing of the antireflection film according to the embodiment of the present invention, the temperature in a case of performing the steps (1) to (4) is preferably 60° C. or lower and more preferably 40° C. or lower. By maintaining the temperature at 60° C. or lower in a case of performing the steps (1) to (4), it is possible to suppress the aggregation of the metal oxide particle and thus it is possible to form a satisfactory uneven shape.

[Step (1)]

The step (1) is a step of providing a curable compound and a metal oxide particle having an average primary particle diameter of 100 nm to 190 nm on a plastic substrate, in a thickness in which the metal oxide particle is buried in a layer (a) including the curable compound.

According to the present invention, the expression "a thickness in which the metal oxide particle is buried in the layer (a)" refers to a thickness of 0.8 times or more of an average primary particle diameter of the metal oxide particles.

In the step (1), a method of providing the layer (a) on the plastic substrate is not particularly limited, but it is preferable to provide the layer (a) by coating the plastic substrate with the layer (a). In this case, the layer (a) is a layer obtained by applying a composition (A) including the curable compound (a1) and the particle (a2). The coating method is not particularly limited, and well-known methods can be used. Examples thereof include a dip coating method, an air knife coating method, a curtain coating method, a roller coating method, a wire bar coating method, a gravure coating method, and a die coating method.

In the step (1), it is preferable that a plurality of particles (a2) are not present in a direction orthogonal to the surface of the plastic substrate. Here, the expression "the plurality of particle (a2) are not present in the direction orthogonal to the surface of the plastic substrate" indicates that, in a case where 10 μm×10 μm of the in-plane of the plastic substrate is observed with three visual fields with a scanning electron microscope (SEM), the proportion of the number of particles (a2) in a state in which a plurality of the particles are not present in the direction orthogonal to the surface is 80% or more and preferably 95% or more.

According to the present invention, before the step (1), another layer may be provided on the plastic substrate. In a case where another layer is provided on the plastic substrate, the layer (a) is provided on the other layer in the step (1) and subsequent steps are performed. As the other layer, a hard coat layer is preferable.

(Layer (a))

The layer (a) includes the curable compound (a1) and the particle (a2).

The layer (a) is a layer for forming the antireflection layer.

The curable compound (a1) included in the layer (a) is cured to become a binder resin of the antireflection layer.

The particle (a2) included in the layer (a) is a particle protruding from the surface of the film formed of the binder resin in the antireflection film and having an uneven shape (moth eye structure).

The layer (a) is cured in the step (4), and thus components contained before curing and after curing are different, but according to the present invention, for convenience, the layer is referred to as the layer (a) at any stage.

The film thickness of the layer (a) in the step (1) is preferably 0.8 times to 2.0 times, more preferably 0.8 times to 1.5 times, and even more preferably 0.9 times to 1.2 times of an average primary particle diameter of the particle (a2).

The plastic substrate, the curable compound (a1), and the particle (a2) are as described above.

<Solvent>

The layer (a) and the composition (A) for forming the layer (a) may include a solvent.

In view of improving the dispersibility, it is preferable to select a solvent having a polarity close to that of the particle (a2). Specifically, for example, an alcohol-based solvent is preferable, and examples thereof include methanol, ethanol, 2-propanol, 1-propanol, and butanol. For example, in a case where the particle (a2) is a metal resin particle subjected to hydrophobic surface modification, ketone-based, ester-based, carbonate-based, alkane, aromatic solvents, and the like are preferable, and examples thereof include methyl ethyl ketone (MEK), dimethyl carbonate, methyl acetate, acetone, methylene chloride, and cyclohexanone. A plurality of these solvents may be mixed to be used without remarkably deteriorating the dispersibility.

<Polymerization Initiator>

The layer (a) or the composition (A) for forming the layer (a) may include a polymerization initiator.

The polymerization initiator may be a radical polymerization initiator or may be a cation polymerization initiator. An appropriate polymerization initiator may be selected according to the types of the polymerizable compound to be combined. As the polymerization initiator, any one of a thermal polymerization initiator or a photopolymerization initiator may be selected according to the types (heating or light irradiation) of the polymerization treatment performed in the manufacturing step. The thermal polymerization initiator and the photopolymerization initiator may be used in combination.

The structure of the thermal polymerization initiator is not particularly limited. Examples of the specific aspects of the thermal polymerization initiator include an azo compound, a hydroxylamine ester compound, organic peroxide, and hydrogen peroxide. Specific examples of the organic peroxide include those disclosed in paragraph 0031 of JP5341155B.

The azo compound may include at least one azo bond, and can include various substituents together with the azo bond. Specifically, an azonitrile compound such as 2,2'-azobisisobutyronitrile, 2,2'-azobis(2-methylisobutyronitrile), 1,1'-azobis(cyclohexane-1-carbonitrile), and 1-[(1-cyano-1-methylethyl)azo]formamide, an azoester compound such as dimethyl 2,2'-azobis(2-methylpropionate) and dimethyl 1,1'-azobis(1-cyclohexane carboxylate), an azoamide compound such as 2,2'-azobis[N-(2-propenyl)-2-methylpropionamide], 2,2'-azobis(N-butyl-2-methylpropionamide), and 2,2'-azobis(N-cyclohexyl-2-methylpropionamide), an azoimidazoline compound such as 2,2'-azobis[2-[1-(2-hydroxyethyl)-2-imidazolin-2-yl] propane] dihydroxy chloride, and 2,2'-azobis[2-(2-imidazolin-2-yl)propane], an azoalkyl compound such as 2,2'-azobis(2,4,4-trimethylpentane), an azoamidine compound, and a polymer containing a repeating unit having an azo bond can be used. Since redox decomposition or induced decomposition hardly occurs, the azo compound is a preferable thermal polymerization initiator.

Examples of the hydroxylamine ester compound include a hydroxylamine ester compound represented by Formula I disclosed in JP2012-521573A. Specific compounds are provided below. However, the present invention is not limited thereto.

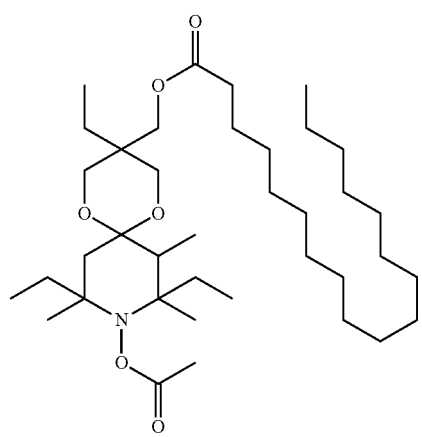

(H-1)

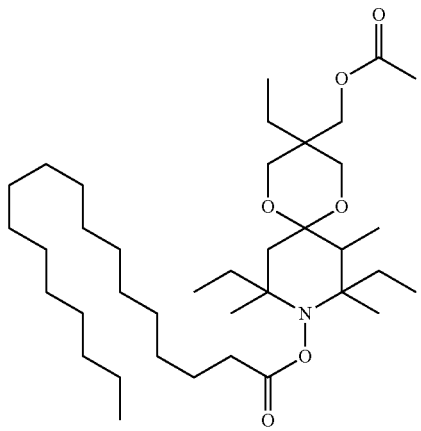

(H-2)

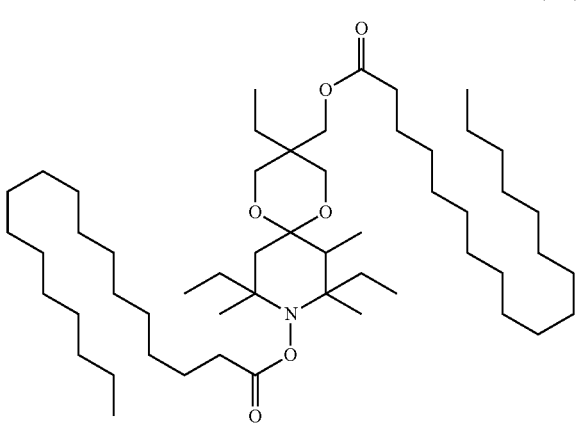

(H-3)

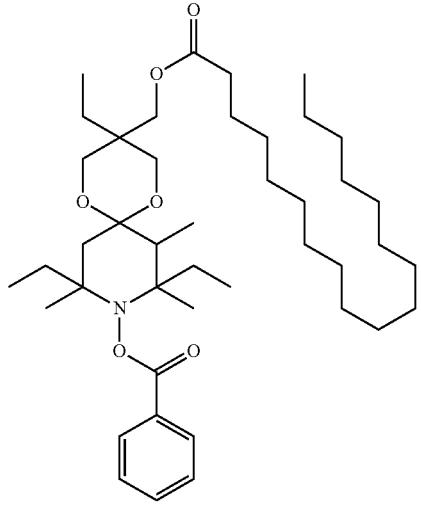

(H-4)

(H-5)
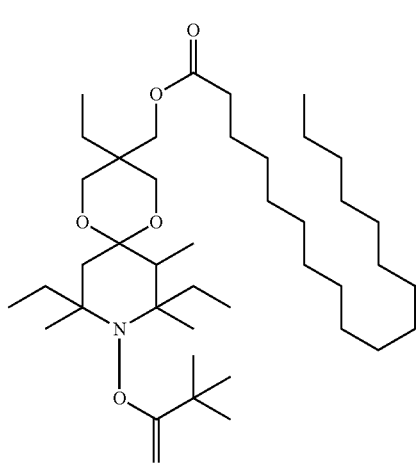

(H-6)
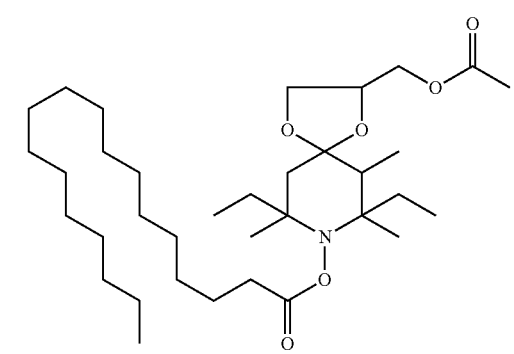

(H-7)
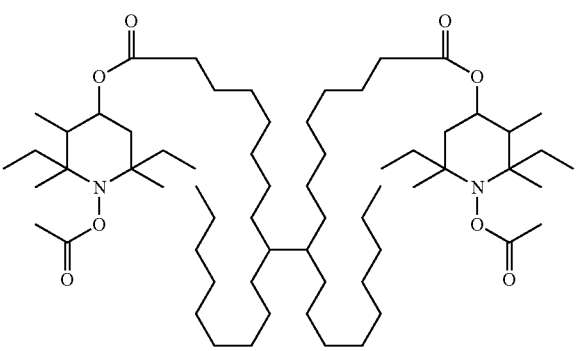

In a case where the curable compound (a1) is a photopolymerizable compound, it is preferable to include a photopolymerization initiator.

The structure of the photopolymerization initiator is not particularly limited. Specific aspect thereof include acetophenones, benzoins, benzophenones, phosphine oxides, ketals, anthraquinones, thioxanthones, an azo compound, peroxides, 2,3-dialkyldione compounds, disulfide compounds, fluoroamine compounds, aromatic sulfoniums, lophine dimers, onium salts, borate salts, active esters, active halogens, an inorganic complex, and coumarins. Specific examples, preferable aspects, commercially available products and the like of the photopolymerization initiator are disclosed in paragraphs [0133] to [0151] of JP2009-098658A and can be appropriately used in the present invention in the same manner.

Various examples are provided in "Newest UV curing technology" {Technical Information Institute Co. Ltd.} (1991), page 159 and "Ultraviolet Curing System" written by Kiyomi KATO (published in 1989 by The Integrated Technology Center), pages 65 to 148, and are useful in the present invention.

The content of the polymerization initiator in the layer (a) is an amount sufficient for polymerizing the polymerizable compound included in the layer (a) and is preferably 0.1 to 8 mass % and more preferably 0.5 to 5 mass % with respect to the total solid content in the layer (a) such that the starting point does not excessively increase.

For the reaction of the silane coupling agent having a polymerizable functional group described above, a compound that generates an acid or a base by light or heat (hereinafter, sometimes referred to as a photoacid generator, a photobase generator, a thermal acid generator, or a thermal base generator) may be included in the layer (a).

<Photoacid Generator>

Examples of the photoacid generator include onium salt such as diazonium salt, ammonium salt, phosphonium salt, iodonium salt, sulfonium salt, selenonium salt, and an arsonium salt, an organohalogen compound, organometallic/organic halide, a photoacid generator having an o-nitrobenzyl-based protecting group, a compound that is photolyzed to generate sulfonic acid and is represented by iminosulfonate and the like, a disulfone compound, diazoketosulfone, and a diazodisulfone compound. Examples thereof also include triazines (for example, 2-(4-methoxyphenyl)-4,6-bis(trichloromethyl)-1,3,5-triazine, and the like), quaternary ammonium salts, a diazomethane compound, an imide sulfonate compound, and an oxime sulfonate compound.

A group that generates an acid by light or a compound obtained by introducing a compound into a main chain or a side chain of a polymer can be used.

Compounds that generate acid by light which are disclosed in V. N. R. Pillai, Synthesis, (1), 1 (1980), A. Abad et al., Tetrahedron Lett., (47) 4555 (1971), D. H. R. Barton et al., J. Chem. Soc., (C), 329 (1970), U.S. Pat. No. 3,779,778A, and EP126,712B can be used.

<Thermal Acid Generator>

Examples of the thermal acid generator include salt including an acid and an organic base.

Examples of the acid described above include organic acid such as sulfonic acid, phosphonic acid, and carboxylic acid and inorganic acid such as sulfuric acid and phosphoric acid. In view of compatibility with the curable compound (a1), organic acid is more preferable, sulfonic acid and phosphonic acid are more preferable, and sulfonic acid is most preferable. Preferable examples of sulfonic acid include p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MsOH), and nonafluorobutane-1-sulfonic acid (NFBS).

As specific examples of the acid generator, acid generators disclosed in JP2016-000803A can be appropriately used.

<Photobase Generator>

Examples of the photobase generator include a substance that generates bases by the action of active energy rays. More specifically, (1) a salt of organic acid and a base which is decomposed by decarburization by irradiation with ultraviolet rays, visible light, or infrared rays, (2) a compound decomposed by intramolecular nucleophilic substitution reaction or dislocation reaction to emit amines, or (3) a substance which causes some chemical reaction by irradiation with ultraviolet rays, visible light, or infrared rays to emit a base can be used.

The photobase generator used in the present invention is not particularly limited, as long as the photobase generator is a substance that generates a base by the action of active energy rays such as ultraviolet rays, electron beams, X-rays, infrared rays, and visible light.

Specifically, photobase generators disclosed in JP2010-243773A can be appropriately used.

The content of the compound that generates an acid or a base by light or heat in the layer (a) is an amount sufficient for polymerizing the polymerizable compound included in the layer (a) and is preferably 0.1 to 8 mass % and more preferably 0.1 to 5 mass % with respect to the total solid content in the layer (a) such that the starting point does not excessively increase.

The layer (a) and the composition (A) for forming the layer (a) may further include a dispersing agent of the particle (a2), a leveling agent, and an antifouling agent, and these are as described above.

[Step (2)]

The step (2) is a step of bonding the layer (b) of the pressure sensitive film having a support and the layer (b) including the pressure sensitive adhesive having a gel fraction of 95.0% or more on a support to the layer (a). The method of bonding the layer (a) and the layer (b) of the pressure sensitive film is not particularly limited, and well-known methods may be used. Examples thereof include a lamination method.

It is preferable to bond a pressure sensitive film such that the layer (a) and the layer (b) are in contact with each other.

Before the step (2), a step of drying the layer (a) may be provided. The drying temperature of the layer (a) is preferably 20° C. to 60° C. and more preferably 20° C. to 40° C. The drying time is preferably 0.1 to 120 seconds and more preferably 1 to 30 seconds.

The present inventors have been found that the layer (b) of the pressure sensitive film and the layer (a) are bonded to each other in the step (2), the particle (a2) is buried in the layer obtained by combining the layer (a) and the layer (b) in the step (3) described below, the particle (a2) is caused to protrude from an interface of the layer (a) on a side opposite to the interface on the plastic substrate side, the layer (a) is cured in a state in which the particle (a2) is buried in the layer obtained by combining the layer (a) and the layer (b) in the step (4) described below, such that the particle (a2) is not exposed to an air interface of the layer (a) before curing, and aggregation is suppressed, so as to manufacture a satisfactory uneven shape formed by the particle (a2).

(Pressure Sensitive Film)

The pressure sensitive film has a support and the layer (b) formed of a pressure sensitive adhesive having a gel fraction of 95.0% or more.

<Layer (b)>

The layer (b) is formed of a pressure sensitive adhesive having a gel fraction of 95.0% or more.

In a case where the gel fraction of the pressure sensitive adhesive is 95.0% or more, in a case where the pressure sensitive film is peeled off to manufacture the antireflection film, it is possible to obtain the antireflection film in which a component of the pressure sensitive adhesive hardly remains on a surface of the antireflection film even in a case where washing is not performed, and reflectance is sufficiently low.

The gel fraction of the pressure sensitive adhesive is preferably in the range of 95.0% to 99.9%, more preferably in the range of 97.0% to 99.9%, and even more preferably in the range of 98.0% to 99.9%.

The gel fraction of the pressure sensitive adhesive is a proportion of an insoluble matter after the pressure sensitive adhesive is immersed in tetrahydrofuran (THF) at 25° C. for 12 hours and is obtained from the following expression.

Gel fraction=(mass of insoluble matter of pressure sensitive adhesive in THF)/(total mass of pressure sensitive adhesive)×100(%)

The weight-average molecular weight of the sol component in the pressure sensitive adhesive is preferably 10,000 or less, more preferably 7,000 or less, and most preferably 5,000 or less. By setting the weight-average molecular weight of the sol component within the above range, the component of the pressure sensitive adhesive can be caused to hardly remain on the surface of the antireflection film in a case where the pressure sensitive film is peeled off to manufacture an antireflection film.

The sol component of the pressure sensitive adhesive represents a dissolution amount in THF after the pressure sensitive adhesive is immersed in tetrahydrofuran (THF) at 25° C. for 12 hours. The weight-average molecular weight can be analyzed by gel permeation chromatography (GPC).

The film thickness of the layer (b) is preferably 0.1 μm to 50 μm, more preferably 1 μm to 30 μm, and even more preferably 1 μm to 20 μm.

The layer (b) is preferably a pressure sensitive adhesive layer having a slight pressure sensitive adhesive strength in which a peeling strength (pressure sensitive adhesive strength) to a surface of an adherend at a peeling rate of 0.3 m/min is about 0.03 to 0.3 N/25 mm, since handleability in a case of peeling off the pressure sensitive film from the layer (a) which is the adherend is excellent.

The pressure sensitive adhesive preferably includes a polymer and more preferably includes a (meth)acrylic polymer. Particularly, a polymer (in a case where two or more kinds of monomers, a copolymer) of at least one monomer of (meth)acrylic acid alkyl ester monomers having an alkyl group of 1 to 18 carbon atoms is preferable. The weight-average molecular weight of the (meth)acrylic polymer is preferably 200,000 to 2,000,000.

Examples of the (meth)acrylic acid alkyl ester monomer in which an alkyl group has 1 to 18 carbon atoms include an alkyl (meth)acrylate monomer such as methyl (meth)acrylate, ethyl (meth)acrylate, propyl (meth)acrylate, butyl (meth)acrylate, isobutyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, cyclopentyl (meth)acrylate, cyclohexyl (meth)acrylate, isomyristyl (meth)acrylate, isocetyl (meth)acrylate, isostearyl (meth)acrylate, myristyl (meth)acrylate, cetyl (meth)acrylate, stearyl (meth)acrylate, tetradecyl (meth)acrylate, pentadecyl (meth)acrylate, hexadecyl (meth)acrylate, heptadecyl (meth)acrylate, and octadecyl (meth)acrylate. The alkyl group of the alkyl (meth)acrylate monomer may be linear, branched or cyclic. Two or more of the monomers may be used in combination.

Preferable examples of the (meth)acrylate monomer having an aliphatic ring include cyclopentyl (meth)acrylate, cyclohexyl (meth)acrylate, cycloheptyl (meth)acrylate, and isobornyl (meth)acrylate. Among these, cyclohexyl (meth)acrylate is particularly preferable.

The (meth)acrylic polymer is a copolymer including at least one of (meth)acrylic acid alkyl ester monomers having an alkyl group of 1 to 18 carbon atoms and at least one of other copolymerizable monomers. In this case, examples of the other copolymerizable monomers include a copolymerizable vinyl monomer containing at least one group selected from a hydroxyl group, a carboxyl group, or an amino group, a copolymerizable vinyl monomer having a vinyl group, and an aromatic monomer.

Examples of the copolymerizable vinyl monomer containing a hydroxyl group include hydroxyl group-containing (meth)acrylate esters such as 2-hydroxyethyl (meth)acrylate, 2-hydroxypropyl (meth)acrylate, 3-hydroxypropyl (meth)acrylate, 4-hydroxybutyl (meth)acrylate, 6-hydroxyhexyl (meth)acrylate, and 8-hydroxyoctyl (meth)acrylate, and hydroxyl group-containing (meth)acrylamides such as N-hydroxy (meth)acrylamide, N-hydroxymethyl (meth) acrylamide, and N-hydroxyethyl (meth)acrylamide, and the copolymerizable vinyl monomer is preferably at least one selected from the group of these compounds.

It is preferable that the content of the copolymerizable vinyl monomer containing a hydroxyl group is 0.1 to 15 parts by mass with respect to 100 parts by mass of the (meth)acrylic polymer.

Examples of the copolymerizable vinyl monomer containing a carboxyl group include (meth)acrylic acid, itaconic acid, crotonic acid, maleic acid, fumaric acid, carboxyethyl (meth)acrylate, and carboxypentyl (meth)acrylate, and at least one selected from the group of these compounds is preferable.

The content of the copolymerizable vinyl monomer containing a carboxyl group is preferably 0.1 to 2 parts by mass with respect to 100 parts by mass of the (meth)acrylic copolymer.

Examples of the copolymerizable vinyl monomer containing an amino group include monoalkylaminoalkyl (meth)acrylate such as monomethylaminoethyl (meth)acrylate, monoethylaminoethyl (meth)acrylate, monomethyl aminopropyl (meth)acrylate, and monoethylaminopropyl (meth)acrylate.

Examples of the aromatic monomer include styrene in addition to aromatic group-containing (meth)acrylate esters such as benzyl (meth)acrylate and phenoxyethyl (meth) acrylate.

Examples of the copolymerizable vinyl monomer other than the above include various vinyl monomers such as acrylamide, acrylonitrile, methyl vinyl ether, ethyl vinyl ether, vinyl acetate, and vinyl chloride.

The pressure sensitive adhesive may include a cured product of a composition (also referred to as a pressure sensitive adhesive composition) for forming the pressure sensitive adhesive.

The pressure sensitive adhesive composition preferably includes the polymer and the crosslinking agent, and may be crosslinked by heat, ultraviolet rays (UV), or the like. The crosslinking agent is preferably one or more crosslinking agents selected from a compound group consisting of a difunctional or higher functional isocyanate-based crosslinking agent, a difunctional or higher functional epoxy-based crosslinking agent, and an aluminum chelate-based crosslinking agent. In a case where a crosslinking agent is used, in order to cause the component of the pressure sensitive adhesive not to remain on the surface of the antireflection film in a case where the pressure sensitive film is peeled off to manufacture the antireflection film, the content of the crosslinking agent is preferably 0.1 to 15 parts by mass, more preferably 3.5 to 15 parts by mass, and even more preferably 5.1 to 10 parts by mass with respect to 100 parts by mass of the polymer.

The difunctional or higher functional isocyanate-based compound may be a polyisocyanate compound having at least two isocyanate (NCO) groups in one molecule, and examples thereof include a burette-modified product and an isocyanurate-modified product of diisocyanates (compounds having two NCO groups in one molecule) such as hexamethylene diisocyanate, isophorone diisocyanate, diphenylmethane diisocyanate, tolylene diisocyanate, and xylylene diisocyanate, and an adduct (polyol-modified product) with trivalent or higher valent polyols (compounds having at least three OH groups in one molecule) such as trimethylolpropane and glycerin.

A trifunctional or higher functional isocyanate compound is a polyisocyanate compound having at least three or more isocyanate (NCO) groups in one molecule, and particularly at least one or more selected from the compound group consisting of an isocyanurate body of a hexamethylene diisocyanate compound, an isocyanurate body of an isophorone diisocyanate compound, an adduct of hexamethylene diisocyanate compound, an adduct of isophorone diisocyanate compound, a burette body of a hexamethylene diisocyanate compound, and a burette body of an isophorone diisocyanate compound are preferable.

The difunctional or higher functional isocyanate-based crosslinking agent is contained in an amount of preferably 0.01 to 5.0 parts by mass and more preferably 0.02 to 3.0 parts by mass, with respect to 100 parts by mass of the polymer.

The pressure sensitive adhesive composition may contain an antistatic agent in order to provide antistatic performances. The antistatic agent is preferably an ionic compound and more preferably quaternary onium salt.

As the antistatic agent which is a quaternary onium salt, for example, an alkyldimethylbenzyl ammonium salt having an alkyl group having 8 to 18 carbon atoms, a dialkylmethylbenzyl ammonium salt having an alkyl group having 8 to 18 carbon atoms, a trialkylbenzyl ammonium salt having an alkyl group having 8 to 18 carbon atoms, a tetraalkyl ammonium salt having an alkyl group having 8 to 18 carbon atoms, an alkyldimethylbenzyl phosphonium salt having an alkyl group having 8 to 18 carbon atoms, a dialkylmethylbenzyl phosphonium salt having an alkyl group having 8 to 18 carbon atoms, a trialkylbenzyl phosphonium salt having an alkyl group having 8 to 18 carbon atoms, a tetraalkyl phosphonium salt having an alkyl group having 8 to 18 carbon atoms, an alkyl trimethyl ammonium salt having an alkyl group having 14 to 20 carbon atoms, and an alkyldimethyl ethyl ammonium salt having an alkyl group having 14 to 20 carbon atoms can be used. These alkyl groups may be alkenyl groups having an unsaturated bond.

Examples of the alkyl group having 8 to 18 carbon atoms include an octyl group, a nonyl group, a decyl group, a dodecyl group, a tridecyl group, a tetradecyl group, a pentadecyl group, a hexadecyl group, a heptadecyl group, and an octadecyl group. The alkyl group having 8 to 18 carbon atoms may be a mixed alkyl group derived from natural fats and oils. Examples of the alkenyl group having 8 to 18 carbon atoms include an octenyl group, a nonenyl group, a decenyl group, a dodecenyl group, a tridecenyl group, a tetradecenyl group, a pentadecenyl group, a hexadecenyl group, a heptadecenyl group, an octadecenyl group, an oleyl group, and a linoleyl group.

Examples of the alkyl group having 14 to 20 carbon atoms include a tetradecyl group, a pentadecyl group, a hexadecyl group, a heptadecyl group, an octadecyl group, a nonadecyl group, and an icosyl group. The alkyl group having 14 to 20 carbon atoms may be a mixed alkyl group derived from natural fats and oils. Examples of the alkenyl group having 14 to 20 carbon atoms include a tetradecenyl group, a pentadecenyl group, a hexadecenyl group, a heptadecenyl group, an octadecenyl group, an oleyl group, a linoleyl group, a nonadecenyl group, and an icosenyl group.

Examples of a counter anion of the quaternary onium salt include chloride (Cl$^-$), bromide (Br$^-$), methyl sulfate (CH$_3$OSO$_3^-$), ethyl sulfate (C$_2$H$_5$OSO$_3^-$), and paratoluene sulfonate (p-CH$_3$C$_6$H$_4$SO$_3^-$).

Specific examples of the quaternary onium salt include dodecyl dimethyl benzyl ammonium chloride, dodecyl dimethyl benzyl ammonium bromide, tetradecyl dimethyl benzyl ammonium chloride, tetradecyldimethylbenzyl ammonium bromide, hexadecyl dimethyl benzyl ammonium chloride, hexadecyl dimethyl benzyl ammonium bromide, octadecyl dimethyl benzyl ammonium chloride, octadecyldimethylbenzyl ammonium bromide, trioctylbenzylammonium chloride, trioctylbenzylammonium bromide, trioctylbenzylphosphonium chloride, trioctylbenzylphosphonium bromide, tris(decyl)benzylammonium chloride, tris(decyl)benzylammonium bromide, tris(decyl)benzylphosphonium chloride, tris(decyl)benzylphosphonium bromide, tetraoctyl ammonium chloride, tetraoctyl ammonium bromide, tetraoctylphosphonium chloride, tetraoctylphosphonium bromide, tetranonyl ammonium chloride, tetranonyl ammonium bromide, tetranonyl phosphonium chloride, tetranonylphosphonium bromide, tetrakis(decyl) ammonium chloride, tetrakis(decyl)ammonium bromide, tetrakis(decyl)phosphonium chloride, and tetrakis(decyl) phosphonium bromide.

"Tris(decyl)" and "tetrakis (decyl)" mean having 3 or 4 decyl groups which are alkyl groups having 10 carbon atoms and is different from a tridecyl group which is an alkyl group having 13 carbon atoms or a tetradecyl group which is an alkyl group having 14 carbon atoms.

As the antistatic agent, in addition to the above, nonionic, cationic, anionic, and amphoteric surfactants, ionic liquid, alkali metal salt, metal oxide, metal fine particles, a conductive polymer, carbon, a carbon nanotube can be used.

Examples of the nonionic surfactant include polyoxyethylene alkyl ethers, polyoxyethylene alkyl phenyl ethers, sorbitan fatty acid esters, polyoxyethylene sorbitan fatty acid esters, polyoxyethylene fatty acid esters, glycerin fatty acid esters, propylene glycol fatty acid esters, and polyoxyalkylene-modified silicones.

Examples of the anionic surfactant include monoalkyl sulfate, alkyl polyoxyethylene sulfates, alkylbenzenesulfonic acid salts, and monoalkyl phosphates.

Examples of the amphoteric surfactant include alkyldimethylamine oxide and alkylcarboxybetaine.

The ionic liquid is a non-polymeric substance including anions and cations and being liquid at room temperature (for example, 25° C.). Examples of the cation portion include a cyclic amidine ion such as an imidazolium ion, a pyridinium ion, an ammonium ion, a sulfonium ion, and a phosphonium ion. Examples of the anion portion include C$_n$H$_{2n+1}$COO$^-$, C$_n$F$_{2n+1}$COO$^-$, NO$_3^-$, C$_n$F$_{2n+1}$SO$_3^-$, (C$_n$F$_{2n+1}$SO$_2$)$_2$N$^-$, (C$_n$F$_{2n+1}$SO$_2$)$_3$C$^-$, PO$_4^{2-}$, AlCl$_4^-$, Al$_2$Cl$_7^-$, ClO$_4^-$, BE$_4^-$, PF$_6^-$, AsF$_6^-$, and SbF$_6^-$.

Examples of the alkali metal salt include metal salt including lithium, sodium, and potassium. In order to stabilize ionic substances, a compound containing a polyoxyalkylene structure may be added.

The antistatic agent preferably contains 0.1 to 10 parts by mass with respect to 100 parts by mass of the polymer.

The pressure sensitive adhesive composition can further contain a polyether-modified siloxane compound having HLB of 7 to 15 as an antistatic aid.

HLB is a hydrophilic-lipophilic balance (hydrophilic lipophilicity ratio) defined, for example, by JIS K3211 (surfactant term) and the like.

The pressure sensitive adhesive composition can further contain a crosslinking accelerator. In a case where a polyisocyanate compound is used as a crosslinking agent, the crosslinking accelerator may be a substance functioning as a catalyst for the reaction (crosslinking reaction) between the copolymer and the crosslinking agent, and examples thereof include an amine-based compound such as tertiary amine, and an organometallic compound such as a metal chelate compound, an organotin compounds, an organic lead compound, and an organozinc compound. According to the present invention, the crosslinking accelerator is preferably a metal chelate compound or an organotin compound.

The metal chelate compound is a compound obtained by bonding one or more polydentate ligands L to the central metal atom M. The metal chelate compound may or may not have one or more monodentate ligands X bonded to the metal atom M. For example, a formula of a metal chelate compound having one metal atom M is represented by M(L)$_m$(X)$_n$, m≥1 and n≥0. In a case where m is 2 or more, m items of L's may be the same ligands or different ligands. In a case where n is 2 or more, n X's may be the same ligand or different ligands.

Examples of the metal atom M include Fe, Ni, Mn, Cr, V, Ti, Ru, Zn, Al, Zr, and Sn. Examples of the polydentate ligand L include β-ketoester such as methyl acetoacetate, ethyl acetoacetate, octyl acetoacetate, oleyl acetoacetate, lauryl acetoacetate, and stearyl acetoacetate, and β-diketone such as acetyl acetone (also referred to as 2,4-pentanedione), 2,4-hexanedione, and benzoylacetone. These are ketoenol tautomeric compounds, and in the polydentate ligand L, enolate obtained by deprotonating enol (for example, acetyl acetonate) may be used.

Examples of the monodentate ligand X include a halogen atom such as a chlorine atom and a bromine atom, an acyloxy group such as a pentanoyl group, a hexanoyl group, a 2-ethylhexanoyl group, an octanoyl group, a nonanoyl group, a decanoyl group, a dodecanoyl group, and an octadecanoyl group, and an alkoxy group such as a methoxy group, an ethoxy group, an n-propoxy group, an isopropoxy group, and a butoxy group.

Specific examples of the metal chelate compound include tris(2,4-pentanedionato) iron (III), iron trisacetyl acetonate, titanium trisacetyl acetonate, ruthenium trisacetyl acetonate, zinc bisacetyl acetonate, aluminum trisacetyl acetonate, zirconium tetrakis acetyl acetonate, tris(2,4-hexanedionato) iron (III), bis(2,4-hexanedionato) zinc, tris(2,4-hexanedionato) titanium, tris(2,4-hexanedionato) aluminum, and tetrakis(2,4-hexanedionato) zirconium.

Examples of the organotin compound include dialkyl tin oxide, fatty acid salt of dialkyl tin, and fatty acid salt of stannous tin. A long-chain alkyl tin compound such as a dioctyl tin compound is preferable. Specific examples of the organotin compound include dioctyl tin oxide and dioctyl tin dilaurate.

The content of the crosslinking accelerator is preferably 0.001 to 0.5 parts by mass with respect to 100 parts by mass of the copolymer.

<Support>

The support in the pressure sensitive film is described.

As the support, a plastic film formed of a resin having transparency and flexibility is preferably used. Preferable examples of the plastic film for the support include a film formed of a polyester film such as polyethylene terephthalate, polyethylene naphthalate, polyethylene isophthalate, and polybutylene terephthalate, a (meth)acrylic resin, a polycarbonate-based resin, a polystyrene-based resin, a polyolefin-based resin, a cyclic polyolefin-based resin, and a cellulose-based resin such as cellulose acylate. Here, the (meth)acrylic resin is preferably a polymer having a lactone ring structure, a polymer having a glutaric anhydride ring structure, and a polymer having a glutarimide ring structure.

Other plastic films can be used as long as the plastic films have required strength and optical suitability. The support may be an unstretched film or may be uniaxially or biaxially stretched. Otherwise, the support may be a plastic film in which an angle of the axis method formed according to the stretching ratio and stretching crystallization is controlled.

As the support, those having ultraviolet permeability are preferable. It is preferable to have ultraviolet permeability in view of manufacturing suitability, since in the step (4), ultraviolet irradiation from the coating layer side can be performed in a case of curing the layer (a).

Specifically, the maximum transmittance of the support at the wavelength of 250 nm to 300 nm is preferably 20% or more, more preferably 40% or more, and most preferably 60% or more. It is preferable that the maximum transmittance at the wavelength of 250 nm to 300 nm is 20% or more, since the layer (a) can be easily cured by being irradiated with ultraviolet rays from the coating layer side.

Specifically, the maximum transmittance of the pressure sensitive film in which the layer (b) is formed on the support at the wavelength of 250 nm to 300 nm is preferably 20% or more, more preferably 40% or more, and most preferably 60% or more.

The film thickness of the support is not particularly limited, but is preferably 10 μm to 100 μm, more preferably 10 μm to 50 μm, and even more preferably 10 μm to 40 μm.

As the pressure sensitive film obtained by forming the layer (b) on the support, a commercially available protective film can be suitably used. Specific examples thereof include AS3-304, AS3-305, AS3-306, AS3-307, AS3-310, AS3-0421, AS3-0520, AS3-0620, LBO-307, NBO-0424, ZBO-0421, S-362, and TFB-4T3-367AS manufactured by Fujimori Kogyo Co., Ltd.

According to the present invention, the layer (a) is cured while a state in which the particle (a2) is buried in the layer obtained by combining the layer (a) and the layer (b) is maintained in the step (4), in the stage before the step (4), it is preferable to have an uneven shape formed by the particle (a2) protruding from the interface of the layer (a). In this manner, in a case where the layer (b) is peeled off in the step (5) after the layer (a) is cured in the step (4), it is possible to obtain the antireflection film in a state in which the particle (a2) protrudes on the surface of the layer (a).

According to the present invention, it is possible to include a step (1-2) of curing a portion of the curable compound (a1) in the layer (a) between the steps (1) and (2) to obtain the cured compound (a1c).

The expression "a portion of the curable compound (a1) is cured" means that not all of the curable compound (a1) is cured, but only a portion thereof is cured. It is preferable to cure only a portion of the curable compound (a1) in the step (1-2), since the aggregation of particles can be suppressed in a case where a position of the interface between the layer (a) and the layer (b) is decreased to the plastic substrate side such that the particles (a2) protrude from the interface of the layer (a) on a side opposite to the plastic substrate side in the step (3), and thus an antireflection film having satisfactory reflectance or satisfactory total light transmittance can be obtained. Since the optimum curing conditions in the step (1-2) differ depending on the formulation of the layer (a), optimal curing conditions may be selected as appropriate.

[Step (3)]

The step (3) is a step of moving the position of the interface between the layer (a) and the layer (b) to the plastic substrate side such that the particle (a2) is buried in the layer obtained by combining the layer (a) and the layer (b) and protrudes from the interface of the layer (a) on a side opposite to the interface on the plastic substrate side.

According to the present invention, the expression "the particle (a2) is buried in the layer obtained by combining the layer (a) and the layer (b)" indicates that the thickness of the layer obtained by combining the layer (a) and the layer (b) is 0.8 times or more of the average primary particle diameter of the particles (a2).

It is preferable that the step (3) is performed by causing a portion of the curable compound (a1) to permeate the pressure sensitive adhesive layer.

In step (3), in a case where a portion of the curable compound (a1) is caused to permeate the pressure sensitive adhesive layer, the laminate having the plastic substrate, the layer (a), and the layer (b) is maintained preferably at 60° C. or lower and more preferably at 40° C. or lower. By maintaining the temperature at 60° C. or lower, the viscosity of the curable compound (a1) and pressure sensitive adhesive can be maintained to be high, and at the same time, the thermal motion of the particles can be suppressed, and thus has a high effect of suppressing the decrease of the antireflection performances due to aggregation of the particles and the increase of the haze or the muddiness. The lower limit of the temperature at which the laminate having the plastic substrate, the layer (a), and the layer (b) is maintained is not particularly limited, and may be the room temperature or a temperature lower than the room temperature (25° C.).

[Step (4)]

The step (4) is a step of curing the layer (a) in a state in which the particle (a2) is buried in the layer obtained by combining the layer (a) and the layer (b).

According to the present invention, the expression "a state in which the particle (a2) is buried in the layer obtained by combining the layer (a) and the layer (b)" indicates that the thickness of the layer obtained by combining the layer (a) and the layer (b) is 0.8 times or more of the average primary particle diameter of the particles (a2).

The expression "curing the layer (a)" means polymerizing the curable compound (a1) included in the layer (a), and a binder resin in the antireflection layer of the antireflection film can be formed. In the step (4), since a state in which the particle (a2) is buried in the layer obtained by combining the layer (a) and the layer (b) is maintained, the aggregation of the particle (a2) is suppressed and the satisfactory uneven shape can be formed.

As a mechanism of suppressing particle aggregation by maintaining a state in which the particle (a2) is buried in the layer obtained by combining the layer (a) and the layer (b), it is assumed that, it is known that a large attractive force derived from the surface tension called lateral capillary force works in a case where the particle (a2) is exposed to the air interface until the layer (a) is cured, and thus by burying the particle (a2) in the layer obtained by combining the layer (a) and the layer (b), the attractive force can be reduced.

The curing can be performed by irradiation with ionizing radiation. The kind of ionizing radiation is not particularly limited, and examples thereof include X-rays, electron beams, ultraviolet rays, visible light, and infrared rays. However, ultraviolet rays are widely used. For example, in a case where the coating film is ultraviolet curable, it is preferable that the curable compound (a1) of the layer (a) is cured by being irradiated with ultraviolet rays in an irradiation amount of 10 mJ/cm$^2$ to 1,000 mJ/cm$^2$ by an ultraviolet lamp. The irradiation amount is more preferably 50 mJ/cm$^2$ to 1,000 mJ/cm$^2$ and still more preferably 100 mJ/cm$^2$ to 500 mJ/cm$^2$. At the time of irradiation, the energy may be applied at once or can be applied in a divided manner. As the ultraviolet lamp type, a metal halide lamp, a high pressure mercury lamp, or the like is suitably used.

The oxygen concentration at the curing is preferably 0 to 1.0 vol %, more preferably 0 to 0.1 vol %, and most preferably 0 to 0.05 vol %. In a case where the oxygen concentration at curing is smaller than 1.0 vol %, curing inhibition caused by oxygen is hardly received, and the film becomes strong.

In the steps (2) to (4), it is preferable that a plurality of particles (a2) are not present in a direction orthogonal to the surface of the plastic substrate.

In steps (2) to (4), the total film thickness of the film thickness of the layer (a) and the film thickness of the layer (b) is preferably more than the average primary particle diameter of the particle (a2).

It is preferable that the total film thickness of the film thickness of the layer (a) and the film thickness of the layer (b) is more than the average primary particle diameter of the particle (a2), since it is possible to cause the particle (a2) to be buried in the layer obtained by combining the layer (a) and the layer (b).

However, since it is possible to obtain a state (moth eye structure) in which the particle (a2) protrudes from the surface of the layer (a) in a case where the pressure sensitive film including the layer (b) in the step (5) described below is peeled off, in the step (4), it is preferable that the film thickness of the layer (a) is smaller than the average primary particle diameter of the particle (a2), and it is more preferable that the film thickness thereof is equal to or less than a half of the average primary particle diameter of the particles (a2).

It is preferable that the film thickness of the layer (a) in the step (4) is adjusted such that the height of the interface on a side opposite to the interface of the layer (ca), which is obtained by curing the layer (a) on the plastic substrate side is adjusted to be equal to or less than a half of the average primary particle diameter of the particle (a2), and it is more preferable that the film thickness thereof is adjusted such that, in a case where the film cross section of the layer (ca) is observed by a scanning electron microscope (SEM) and the film thicknesses at 100 random points are measured to obtain the average value, the average value becomes 10 nm to 100 nm (more preferably 20 nm to 90 nm and even more preferably 30 nm to 70 nm).

[Step (5)]

Step (5) is a step of peeling off the layer (b) from the layer (a).

In a case where the layer (b) is peeled off, in a case where the pressure sensitive adhesive remains on the layer (a) side, the plastic substrate and the cured layer (a) are not dissolved and may be washed with a solvent that dissolves the pressure sensitive adhesive.

After the pressure sensitive film including the layer (b) is peeled off in the step (5), it is possible to obtain an antireflection film having a moth eye structure including an uneven shape formed of the particle (a2) on the surface of the layer (a).

EXAMPLES

Hereinafter, the present invention is specifically described with reference to the examples. A material, a reagent, a substance quantity, a ratio thereof, an operation, and the like provided in the following examples can be suitably changed without departing from the gist of the present invention. Accordingly, the scope of the present invention is not limited to the following specific examples.

Example 1

(Preparation of Composition for Forming Hard Coat Layer)

Each component was mixed in the following composition, and the obtained composition was introduced to a mixing tank, stirred, and filtrated with a polypropylene filter having a pore size 0.4 μm so as to obtain a hard coat layer coating liquid HC-1.

(Hard Coat Layer Coating Liquid HC-1)

| | |
|---|---|
| A-TMMT | 24.4 parts by mass |
| AD-TMP | 12.0 parts by mass |
| IRGACURE 127 | 1.6 parts by mass |
| AS-1 | 2.0 parts by mass |
| Ethanol | 3.5 parts by mass |
| Methanol | 8.8 parts by mass |
| 1-Butanol | 6.0 parts by mass |
| Methyl ethyl ketone (MEK) | 20.3 parts by mass |
| Methyl acetate | 21.4 parts by mass |
| FP-1 | 0.05 parts by mass |

A-TMMT: Pentaerythritol tetraacrylate (manufactured by Shin Nakamura Chemical Co., Ltd.)

AD-TMP: ditrimethylolpropane tetraacrylate (manufactured by Shin-Nakamura Chemical Co., Ltd., NK ESTER)

IRGACURE 127: Photopolymerization initiator (manufactured by BASF Japan Ltd.)

AS-1: A compound AS-1 corresponding the above patent document (A-6) was manufactured in the same manner except that the reaction temperature and time of Synthesis Example 6 of JP4678451B were set as 70° C. and 6 hours. The completed compound AS-1 was a quaternary ammonium salt-containing polymer having an ethylene oxide chain, and the weight-average molecular weight measured by GPC was about 60,000.

FP-1: Methyl ethyl ketone solution of a fluorine-containing compound represented by the following formula, and the solid content concentration was 40 mass %.

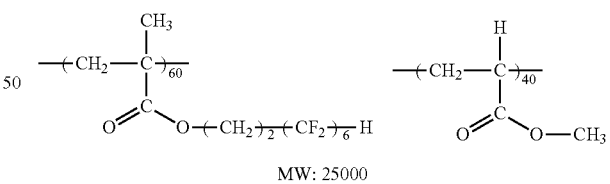

MW: 25000

[Synthesis of Silica Particle P1]

67.54 kg of methyl alcohol and 26.33 kg of 28 mass % aqueous ammonia (water and catalyst) were introduced to a reactor with capacity of 200 L comprising a stirrer, a dropwise adding device, and a thermometer, and the liquid temperature was adjusted to 33° C. while stirring. On the other hand, a solution prepared by dissolving 12.70 kg of tetramethoxy silane in 5.59 kg of methyl alcohol was introduced to the dropwise adding device. While the liquid temperature in the reactor was maintained to 33° C., the above solution was added dropwise from the dropwise adding device over 37 minutes. After the dropwise addition was completed, stirring was continued while the liquid temperature was maintained to the above temperature for 37 minutes, and hydrolysis and condensation of tetramethoxy silane were performed, so as to obtain a dispersion liquid containing a silica particle precursor. This dispersion liquid was air-dried under the conditions of a heating tube temperature of 175° C. and a reduced pressure degree of 200 torr (27 kPa) by using an instantaneous vacuum evaporator (CRUX SYSTEM CVX-8B model manufactured by Hosokawa Micron Corporation), so as to obtain a silica particle P1.

The average primary particle diameter of the silica particle P1 was 170 nm, the dispersion degree (CV value) of the particle diameter was 7.0%, and the indentation hardness was 340 MPa.

[Manufacturing of Calcined Silica Particle P2]

5 kg of the silica particle P1 was introduced to a crucible, calcined at 900° C. for two hours in an electric furnace, cooled, and then pulverized by using a pulverizer to obtain the calcined silica particle before classification. Disintegration and classification were performed by using a jet pulverizing classifier (IDS-2 model manufactured by Nippon Pneumatic Mfg., Co., Ltd.) to obtain a calcined silica particle P2.

[Manufacturing of Silane Coupling Agent-Treated Silica Particle P3]

5 kg of the calcined silica particle P2 was introduced to a Henschel mixer (FM20J model manufactured by Nippon Coke & Engineering Co., Ltd.) having a capacity of 20 L comprising a heating jacket. A solution obtained by dissolving 50 g of 3-acryloxypropyltrimethoxy silane (KBM 5103 manufactured by Shin-Etsu Chemical Co., Ltd.) in 90 g of methyl alcohol was added dropwise to a portion in which the calcined silica particle P2 was stirred and mixed. Thereafter, the temperature was raised to 150° C. over about one hour while mixing and stirring, and the mixture was maintained at 150° C. for 12 hours, and the heat treatment was performed. Thereafter, in the heat treatment, the attachment on the wall was scraped off while the scraping device was rotated constantly in the opposite direction to the stirring blade. If necessary, the deposits on the wall were scraped off with a spatula. After heating, cooling was performed, and disintegration and classification were performed by using a jet pulverizing classifier, so as to obtain a silane coupling agent treated silica particle P3.

The average primary particle diameter of the silane coupling agent treated silica particle P3 was 171 nm, the dispersion degree (CV value) of the particle diameter was 7.0%, and the indentation hardness was 470 MPa.

[Manufacturing of Silica Particle Dispersion Liquid PA-1]

50 g of the silica particle P3 treated with a silane coupling agent, 200 g of MEK, and 600 g of zirconia beads having a diameter of 0.05 mm were introduced in a 1 L bottle having a diameter of 12 cm, set in a ball mill V-2M (IRIE SHOKAI Co., Ltd.), and dispersed for 10 hours at 250 rotation/min. In this manner, a silica particle dispersion liquid PA-1 (concentration of solid content: 20 mass %) was manufactured.

[Synthesis of Compound C3]

19.3 g of 3-isocyanatepropyltrimethoxy silane, 3.9 g of glycerin 1,3-bisacrylate, 6.8 g of 2-hydroxyethyl acrylate, 0.1 g of dibutyltin dilaurate, and 70.0 g of toluene were added to a flask equipped with a reflux condenser and a thermometer and were stirred at room temperature for 12 hours. After stirring, 500 ppm of methylhydroquinone was added, and distillation under reduced pressure was performed, so as to obtain compound C3.

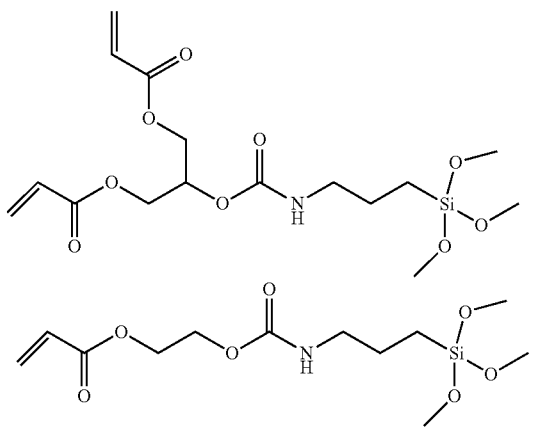

[Preparation of Composition for Forming Layer (a)]

Each component was introduced to a mixing tank so as to have the composition, was stirred for 60 minutes, and was dispersed by an ultrasonic disperser for 30 minutes to obtain a coating liquid.

Composition (A-1)

| | |
|---|---|
| U-15HA | 1.4 parts by mass |
| Compound C3 | 1.5 parts by mass |
| Acetyl triethyl citrate | 5.8 parts by mass |
| IRGACURE 127 | 0.2 parts by mass |
| Compound P | 0.1 parts by mass |
| Silica particle dispersion liquid PA-1 | 32.3 parts by mass |
| Compound A | 0.1 parts by mass |
| Ethanol | 12.7 parts by mass |
| Methyl ethyl ketone | 33.3 parts by mass |
| Acetone | 12.7 parts by mass |

U-15HA, Compound C3, and acetyl triethyl citrate are binder compounds, and U-15HA and Compound C3 are curable compounds (a1), and acetyl triethyl citrate is a compound not having a polymerizable functional group.

The compounds used are provided below.

U-15HA (manufactured by Shin Nakamura Chemical Co., Ltd.): Urethane acrylate

IRGACURE 127: Photopolymerization initiator (manufactured by BASF Japan Ltd.)

Compound P: 2-(4-Methoxyphenyl)-4,6-bis(trichloromethyl)-1,3,5-triazine (photoacid generator, manufactured by Tokyo Chemical Industry Co., Ltd.)

Compound A: F-784-F (manufactured by DIC Corporation)

Acetyl triethyl citrate, manufactured by Tokyo Chemical Industry Co., Ltd.

<Preparation of Antireflection Film 1>

(Forming of Hard Coat Layer)

The plastic substrate (TJ25, manufactured by Fujifilm Corporation) was coated with the hard coat layer coating liquid HC-1 by using a die coater. After drying was performed at 30° C. for 90 seconds and then at 45° C. for one minute, while nitrogen purging is performed so as to have an atmosphere of an oxygen concentration of approximately 0.3 vol %, irradiation is performed with ultraviolet rays in an illuminance of 200 mW/cm$^2$ and in an irradiation amount of 10 mJ/cm$^2$ by using an air-cooled metal halide lamp (manufactured by Eye Graphics Co., Ltd.) of 160 W/cm so as to cure a coating layer, such that a hard coat layer having a thickness of 5 μm is formed. The substrate with a hard coat layer is set as HC-1.

(Step (1): Coating of Layer (a))

A hard coat layer of the substrate HC-1 with a hard coat layer was coated with the composition (A-1) by using a die coater at 2.8 ml/m$^2$, and was dried for 90 seconds at 30° C. The film thickness of the layer (a) in the step (1) was 190 nm.

(Step (1-2): Step of curing portion of curable compound (a1) in layer (a) to obtain cured compound (a1c))

While nitrogen purging was performed so as to be an atmosphere in which an oxygen concentration of 1.5 vol %, light irradiation was performed from the layer (a) side at an irradiation amount of 5.0 mJ by using a high pressure mercury lamp (manufactured by Dr. Honle AG, model number: 33351N and Part no.: LAMP-HOZ 200 D24 U 450 E), so as to cure a part of the curable compound (a1). With respect to the measurement of the irradiation amount, HEAD SENSER PD-365 was mounted on an eye ultraviolet ray integrating accumulation light meter UV METER UVPF-A1 manufactured by Eye Graphics, Inc., and the measurement was performed in a measurement range of 0.00.

(Step (2): Bonding of Pressure Sensitive Film)

Subsequently, the pressure sensitive film obtained by peeling off a release film from AS3-304 was bonded to the dried layer (a) such that the pressure sensitive adhesive layer (layer (b)) became the layer (a) side. The bonding was performed at a speed of 1 by using a commercial laminator Bio330 (manufactured by DAE-EL Co.).

AS3-304 refers to a laminate (protective film) formed of the support/the pressure sensitive adhesive layer/the release film, and a laminate obtained by peeling off the release film from the laminate and formed of the support/the pressure sensitive adhesive layer is a pressure sensitive film.

Details of the laminate (protective film) used are provided below.

AS3-304 manufactured by Fujimori Kogyo Co., Ltd.

Support: Polyester film (thickness: 38 μm)

Thickness of pressure sensitive adhesive layer: 20 μm

Maximum transmittance at wavelength of 250 nm to 300 nm in state in which release film was peeled: Less than 0.1%

The transmittance was measured using an ultraviolet-visible-near infrared spectrophotometer UV3150 manufactured by Shimadzu Corporation.

(Step (3): Permeation of Curable Compound (a1) into Pressure Sensitive Adhesive Layer)

While the pressure sensitive film was bonded, the film was left at 25° C. for five minutes such that a portion of the curable compound (a1) permeates the pressure sensitive adhesive layer.

(Step (4): Curing of Layer (a))

Subsequently to the leaving, irradiation was performed with ultraviolet rays having an illuminance of 200 mW/cm$^2$ and an irradiation amount of 300 mJ/cm$^2$ over the pressure sensitive film from the surface covered with the layer (a) of the plastic substrate by using an air-cooled metal halide lamp (manufactured by Eye Graphics Co., Ltd.) of 160 W/cm while purging was performed with nitrogen such that the atmosphere had an oxygen concentration of 0.01 vol % or less, so as to cure the layer (a). After the step (4), the film thicknesses of the layer (a) and the pressure sensitive adhesive layer (layer (b)) before the step (5) was performed were respectively 50 nm and 20 μm.

(Step (5): Peeling of Pressure Sensitive Film)

A pressure sensitive film (film obtained by peeling off the release film from AS3-304) including the layer (b) was peeled off from the manufactured laminate. The layer (a) after the layer (b) was peeled off was cured to a degree of not being broken by the peeling of the pressure sensitive adhesive layer. After the pressure sensitive adhesive was peeled off, the surface covered with the layer (a) of the plastic substrate was irradiated with ultraviolet rays having an illuminance of 200 mW/cm$^2$ and an irradiation amount of 300 mJ/cm$^2$ by using an air-cooled metal halide lamp (manufactured by Eye Graphics Co., Ltd.) of 160 W/cm while purging was performed with nitrogen such that the atmosphere had an oxygen concentration of 0.01 vol % or less, so as to cure the layer (a). Thereafter, methyl isobutyl ketone was applied to the surface to which the pressure sensitive film was bonded so as to rinse out a residue of the pressure sensitive adhesive layer, and drying was performed at 25° C. for 10 minutes so as to obtain the antireflection film 1.

Comparative Example 1

An antireflection film R1 was obtained in the same manner as in Example 1 except that the leaving in the step (3) was performed at 120° C. for 15 minutes.

(Integrated Reflectance)

In the obtained antireflection film, in a state in which after the back side (plastic substrate side) of the film was roughened with sandpaper, an oily black ink (magic ink for supplement: Teranishi Chemical Industry Co., Ltd.) was applied such that back side reflection was eliminated, an adapter ARV-474 was attached to a spectrophotometer V-550 (manufactured by JASCO Corporation), in the wavelength range of 380 to 780 nm, the integrated reflectance at an incidence angle of 5° was measured, and the average reflectance was calculated, so as to evaluate the antireflection properties.

(Transmittance)

The total light transmittance of the antireflection film in a case of being incident from a side of the antireflection layer opposite to the plastic substrate, a transmittance ($T_{480}$) of light at a wavelength of 480 nm of the antireflection film in a case of being incident from a side of the antireflection layer opposite to the plastic substrate, and a transmittance ($T_{580}$) of light at 580 nm were measured.

The total light transmittance was measured by using a haze meter NDH4000 manufactured by Nippon Denshoku Industries Co., Ltd.

The transmittance ($T_{480}$) of the light at a wavelength of 480 nm and the transmittance of ($T_{580}$) of the light at a wavelength of 580 nm were measured with an ultraviolet-visible-near infrared spectrophotometer UV3150 manufactured by Shimadzu Corporation.

(Log SR)

The surface resistivity of the antireflection layer was measured by using Agilent 4339B High-Resistance meter (manufactured by Agilent Technologies Japan, Ltd.) after an antireflection film sample was left for two hours under the conditions of 25° C. and relative humidity of 60% and indicated as a common logarithm (log SR).

(X, X+σ, and Particle Occupancy Ratio)

The surface of the antireflection film was observed with SEM (S-4300 manufactured by Hitachi High-Technologies Corporation), and a particle occupancy ratio was obtained as an area occupied by the particles/a measured area. The magnification was 10,000 times. Cutting was performed with a microtome so as to obtain a cross section, SEM observation was performed at 10,000 times, the distance A between the peaks of adjacent protrusions is measured at 100 points, and an average value X and a standard deviation σ were obtained.

Examples 2 to 6

Antireflection films 2 to 6 were manufactured by in the same manner as in Example 1 except that the hard coat layer coating liquid HC-1 was substituted with the hard coat layer coating liquids HC-2 to HC-6 in the compositions as presented in Table 1 in Example 1.

Example 7

The hard coat layer having a film thickness of 0.8 μm was laminated on the hard coat layer of Example 2 with a hard coat layer coating liquid HC-7 in the composition as presented in Table 1. The drying and curing conditions of the hard coat layer coating liquid HC-7 were the same as those of the hard coat layer coating liquid HC-1 of Example 1.

[Manufacturing of Calcined Silica Particle P7]

A calcined silica particle P7 was obtained in the same manner as that of the calcined silica particle P2 except that the silica particle P5 was used instead of the silica particle P1.

[Manufacturing of Silane Coupling Agent-Treated Silica Particle P8]

A silane coupling agent-treated silica particle P8 was obtained in the same manner as that of the silane coupling agent-treated silica particle P3, except that the calcined silica particle P6 was used instead of the calcined silica particle P2, and the dropwise addition amount of 3-acryloxypropyltrimethoxy silane (KBM 5103 manufactured by Shin-Etsu Chemical Co., Ltd.) was changed to 65 g.

The average primary particle diameter of the silane coupling agent treated silica particle P8 was 151 nm, the

TABLE 1

| Hard coat layer coating liquid | A-TMMT | AD-TMP | DPCA60 | irg127 | irg819 | AS-1 | Ethanol | Methanol | 1-Buthanol | MEK | Methyl acetate | FP-1 |
|---|---|---|---|---|---|---|---|---|---|---|---|---|
| HC-1 | 24.4 | 12 | 0 | 1.6 | 0 | 2 | 3.5 | 8.8 | 6 | 20.3 | 21.4 | 0.05 |
| HC-2 | 24.1 | 11.9 | 0 | 1.6 | 0 | 8 | 1.8 | 4.8 | 6 | 20.3 | 21.4 | 0.05 |
| HC-3 | 25.7 | 12.6 | 0 | 1.6 | 0 | 0 | 3.5 | 8.7 | 6 | 20.3 | 21.4 | 0.05 |
| HC-4 | 24.1 | 0 | 11.9 | 1.6 | 0 | 8 | 1.8 | 4.8 | 6 | 20.3 | 21.4 | 0.05 |
| HC-5 | 24.1 | 11.9 | 0 | 1.6 | 0 | 8 | 1.8 | 4.8 | 21 | 16.9 | 9.8 | 0.05 |
| HC-6 | 24.1 | 11.9 | 0 | 0 | 1.6 | 8 | 1.8 | 4.8 | 21 | 16.9 | 9.8 | 0.05 |
| HC-7 | 5 | 0 | 0 | 0.3 | 0 | 0 | 0 | 0 | 0 | 0 | 0 | 0.01 |

DPCA60: DPCA-60 manufactured by Nippon Kayaku Co., Ltd.

irg127: IRGACURE 127, Photopolymerization initiator (manufactured by BASF Japan Ltd.)

irg819: IRGACURE 819, Phosphine oxide-based photopolymerization initiator (manufactured by BASF Japan Ltd.)

[Synthesis of Silica Particle P4]

A silica particle P4 was obtained in the same method as in the silica particle P1 except that, while the liquid temperature in the reactor was maintained at 33° C., the dropwise addition time of the solution from the dropwise adding device was changed to 25 minutes, and the stirring time while the liquid temperature was maintained at the same temperature after the dropwise addition was completed was changed to 25 minutes.

The average primary particle diameter of the silica particle P4 was 150 nm, the dispersion degree (CV value) of the particle diameter was 11.0%, and the indentation hardness was 340 MPa.

[Synthesis of silica particle P5]

A silica particle P5 was obtained in the same method as in the silica particle P1 except that, the dropwise addition time of the solution from the dropwise adding device was changed to 60 minutes while the liquid temperature in the reactor was maintained at 33° C., and the stirring time while the liquid temperature was maintained at the same temperature after the dropwise addition was completed was changed to 60 minutes.

The average primary particle diameter of the silica particle P5 was 205 nm, the dispersion degree (CV value) of the particle diameter was 3.0%, and the indentation hardness was 340 MPa.

[Manufacturing of Calcined Silica Particle P6]

A calcined silica particle P6 was obtained in the same manner as that of the calcined silica particle P2 except that the silica particle P4 was used instead of the silica particle P1.

dispersion degree (CV value) of the particle diameter was 11.0%, and the indentation hardness was 470 MPa.

[Manufacturing of Silane Coupling Agent-Treated Silica Particle P9]

A silane coupling agent-treated silica particle P9 was obtained in the same manner as that of the silane coupling agent-treated silica particle P3, except that the calcined silica particle P7 was used instead of the calcined silica particle P2, and the dropwise addition amount of 3-acryloxypropyltrimethoxy silane (KBM 5103 manufactured by Shin-Etsu Chemical Co., Ltd.) was changed to 25 g.

The average primary particle diameter of the silane coupling agent treated silica particle P9 was 206 nm, the dispersion degree (CV value) of the particle diameter was 3.0%, and the indentation hardness was 470 MPa.

[Manufacturing of Silica Particle Dispersion Liquid PA-2]

A silica particle dispersion liquid PA-2 (concentration of solid content: 20 mass %) was manufactured in the same manner as that of the silica particle dispersion liquid PA-1, except that the silane coupling agent-treated silica particle P8 was used instead of the silane coupling agent-treated silica particle P3.

[Manufacturing of Silica Particle Dispersion Liquid PA-3]

A silica particle dispersion liquid PA-3 (concentration of solid content: 20 mass %) was manufactured in the same manner as that of the silica particle dispersion liquid PA-1, except that the silane coupling agent-treated silica particle P9 was used instead of the silane coupling agent-treated silica particle P3.

Example 8

Except that the silica particle dispersion liquid PA-1 of the composition (A-1) for forming the layer (a) was changed to a silica particle dispersion liquid PA-2 (this composition for forming the layer (a) is referred to as a composition (A-2)), an antireflection film 8 was manufactured by in the same manner as in Example 1.

Example 9

Except that acetyl triethyl citrate of the composition (A-2) for forming the layer (a) was changed to dimethyl suberate (manufactured by Tokyo Chemical Industry Co., Ltd.) (this composition for forming the layer (a) is referred to as a composition (A-3)), and the irradiation amount in the step (1-2) was set to 7.5 mJ, an antireflection film 9 was manufactured by in the same manner as in Example 8.

Example 10

Except that acetyl triethyl citrate of the composition (A-2) for forming the layer (a) was changed to dibutyl succinate (manufactured by Tokyo Chemical Industry Co., Ltd.) (this composition for forming the layer (a) is referred to as a composition (A-4)), and the irradiation amount in the step (1-2) was set to 10 mJ, an antireflection film 10 was manufactured by in the same manner as in Example 8.

Example 11

An antireflection film 11 was manufactured in the same manner as in Example 9 except that the composition for forming the layer (a) was changed to (A-5) in the composition below, and heating was performed at 140° C. for 15 minutes between the steps (4) and (5).

Composition (A-5)

| | |
|---|---|
| U-15HA | 1.4 parts by mass |
| Compound C3 | 1.5 parts by mass |
| Dimethyl suberate | 4.1 parts by mass |
| A-TMPT | 1.7 parts by mass |
| IRGACURE 127 | 0.2 parts by mass |
| V-601 | 0.2 parts by mass |
| Compound P-2 | 0.1 parts by mass |
| Silica particle dispersion liquid PA-2 | 32.3 parts by mass |
| Compound B | 0.1 parts by mass |
| Ethanol | 12.7 parts by mass |
| Methyl ethyl ketone | 33.3 parts by mass |
| Acetone | 12.7 parts by mass |

The compounds used are provided below.

A-TMPT: Polyfunctional acrylate (Shin-Nakamura Chemical Co., Ltd.)

V-601: Thermal polymerization initiator, dimethyl 2,2'-azobis(2-methylpropionate) (manufactured by Wako Pure Chemical Industries, Ltd.)

Compound P-2: Compound having the following structure (manufactured by Wako Pure Chemical Industries, Ltd.)

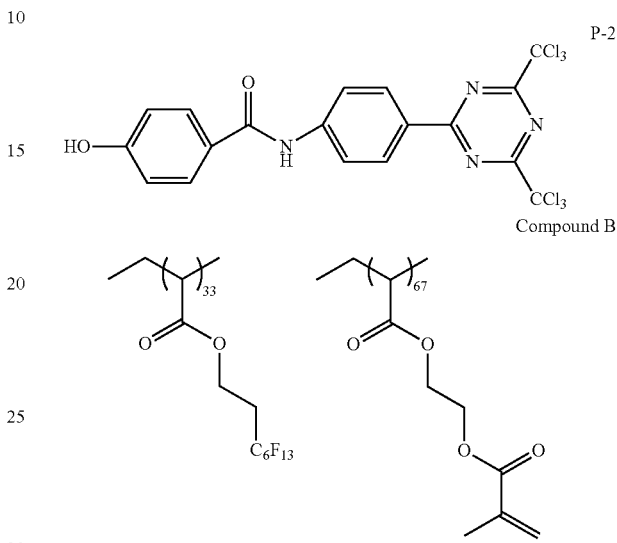

The weight-average molecular weight of the compound B was 17,000.

Example 12

Except that the silica particle dispersion liquid PA-1 of the composition (A-1) for forming the layer (a) was changed to a silica particle dispersion liquid PA-3 (this composition for forming the layer (a) is referred to as the composition (A-6)), an antireflection film 12 was manufactured in the same manner as in Example 1.

The evaluation results thereof are presented in Table 2.

TABLE 2

| | Antireflection film | Integrated reflectance | Total light transmittance | X (nm) | X + σ (nm) | $T_{580} - T_{480}$ | log SR |
|---|---|---|---|---|---|---|---|
| Example 1 | 1 | 0.7% | 94.2% | 185 | 205 | 2.0% | 11 |
| Example 2 | 2 | 0.8% | 93.5% | 198 | 233 | 3.2% | 8 |
| Example 3 | 3 | 0.8% | 95.2% | 177 | 196 | 1.8% | 16 |
| Example 4 | 4 | 0.7% | 94.4% | 187 | 210 | 2.2% | 10 |
| Example 5 | 5 | 0.7% | 94.3% | 189 | 215 | 2.4% | 10 |
| Example 6 | 6 | 0.7% | 94.6% | 180 | 201 | 1.9% | 10 |
| Example 7 | 7 | 0.7% | 95.2% | 178 | 197 | 1.8% | 10 |
| Example 8 | 8 | 0.7% | 95.1% | 163 | 183 | 1.6% | 11 |
| Example 9 | 9 | 0.6% | 95.2% | 162 | 184 | 1.6% | 11 |
| Example 10 | 10 | 0.6% | 95.3% | 163 | 184 | 1.6% | 11 |
| Example 11 | 11 | 0.6% | 95.2% | 162 | 184 | 1.6% | 11 |
| Example 12 | 12 | 0.7% | 92.6% | 218 | 228 | 3.3% | 11 |
| Comparative Example 1 | R1 | 0.7% | 92.4% | 203 | 241 | 3.7% | 11 |

The particle occupancy ratio of Example 1 was 47.6%.

The antireflection films of Examples 1 to 12 were films in which antireflection performance was satisfactory, a total light transmittance was high, and $T_{580}-T_{480}$ was less, that is, a transmittance of light in the short wavelength range of the visible light was high. Meanwhile, in the antireflection film of Comparative Example 1, $T_{580}-T_{480}$ was great and the transmittance of light in the short wavelength range of visible light was low, compared with the antireflection film of Example 1.

The antireflection films of Examples 1 to 12 had high transmittance of light in the short wavelength range of visible light, and thus tint change or the like hardly occurs. Particularly, it is considered that the occurrence of the tint change can be suppressed even in a case where two antireflection films were used in a liquid crystal display device with a touch panel or the like.

According to the present invention, it is possible to provide an antireflection film having satisfactory antireflection performance, a high total light transmittance, and a high transmittance of light in a short wavelength range of visible light, a method of manufacturing the antireflection film, an antireflection product having the antireflection film, a polarizing plate, an image display device, a module, and a liquid crystal display device with a touch panel.

The present invention has been described in detail and with reference to specific embodiments, but it is obvious to those skilled in the art that various changes and modifications can be made without departing from the spirit and scope of the present invention.

EXPLANATION OF REFERENCES

1: plastic substrate
2: antireflection layer
3: metal oxide particle (particle (a2))
4: binder resin (layer (a))
5: support
6: layer (b)
7: pressure sensitive film
10, 10a, 10b: antireflection film
11: air gap
12: touch panel
13: liquid crystal cell
14: protective film
15: polarizer
20: module
30: liquid crystal display device with touch panel
A: distance between peaks of adjacent protrusions
B: distance between the center between peaks of adjacent protrusions and recessed part
UV: ultraviolet ray

What is claimed is:

1. A module comprising:
   two antireflection films each comprising:
      a plastic substrate; and
      an antireflection layer,
      wherein the antireflection layer includes a metal oxide particle and a binder resin,
      the antireflection layer has a moth eye structure including an uneven shape formed by the metal oxide particle,
      a total light transmittance of the antireflection film in a case where light is incident from a side of the antireflection layer opposite to the plastic substrate is 88% or more, and
      in a case where transmittances of light at wavelengths of 480 nm and 580 nm of the antireflection film where the light is incident from a side of the antireflection layer opposite to the plastic substrate are respectively $T_{480}$ and $T_{580}$, $T_{580}-T_{480} \leq 3.5\%$ is satisfied;
   each antireflection film further comprising:
      a hard coat layer between the plastic substrate and the antireflection layer,
   wherein the two antireflection films are placed to face each other via an air gap.

2. The module according to claim 1,
   wherein in the two antireflection films, the antireflection layer is disposed closer to the air gap side than the plastic substrate.

3. A liquid crystal display device with a touch panel comprising:
   the module according to claim 2;
   a touch panel on a side of the plastic substrate of one antireflection film of the two antireflection films opposite to the antireflection layer side; and
   a liquid crystal cell on a side of the plastic substrate of the other antireflection film opposite to the antireflection layer side.

* * * * *